(12) United States Patent
Kawaura

(10) Patent No.: US 8,453,137 B2
(45) Date of Patent: *May 28, 2013

(54) IMAGE FORMING APPARATUS INCLUDING A DEVICE THAT UPDATES STORED PROGRAM BASED ON UPDATING DATA WHICH IS SELECTED BASED ON PROGRAM THAT IS STARTED OR STARTABLE

(75) Inventor: Hisanori Kawaura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 566 days.

This patent is subject to a terminal disclaimer.

(21) Appl. No.: 12/711,961

(22) Filed: Feb. 24, 2010

(65) Prior Publication Data

US 2010/0149596 A1 Jun. 17, 2010

Related U.S. Application Data

(63) Continuation of application No. 11/000,094, filed on Dec. 1, 2004, now Pat. No. 7,725,890, which is a continuation of application No. 10/851,316, filed on May 24, 2004, now Pat. No. 6,915,085, which is a continuation of application No. 10/227,303, filed on Aug. 26, 2002, now Pat. No. 6,952,535.

(30) Foreign Application Priority Data

Aug. 27, 2001 (JP) ................................. 2001-257043
Aug. 22, 2002 (JP) ................................. 2002-242528

(51) Int. Cl.
*G06F 9/45* (2006.01)
(52) U.S. Cl.
USPC ........................................................ 717/168

(58) Field of Classification Search
USPC ........................................................ 717/168
See application file for complete search history.

(56) References Cited

U.S. PATENT DOCUMENTS

| 5,838,981 A | 11/1998 | Gotoh |
| 5,875,380 A | 2/1999 | Iwata et al. |
| 5,890,029 A | 3/1999 | Hirata et al. |
| 5,953,567 A | 9/1999 | Muramatsu et al. |
| 5,960,445 A | 9/1999 | Tamori et al. |
| 5,987,298 A | 11/1999 | Muramatsu et al. |
| 6,112,046 A | 8/2000 | Suzuki et al. |
| 6,122,468 A | 9/2000 | Sakamoto et al. |
| 6,128,459 A | 10/2000 | Iwata et al. |
| 6,142,690 A | 11/2000 | Yoshimura et al. |
| 6,163,669 A | 12/2000 | Aoki et al. |
| 6,188,851 B1 | 2/2001 | Eom |
| 6,201,941 B1 | 3/2001 | Kasahara et al. |

(Continued)

FOREIGN PATENT DOCUMENTS

| JP | 5-274157 | 10/1993 |
| JP | 8-153005 | 6/1996 |

(Continued)

*Primary Examiner* — John Chavis
(74) *Attorney, Agent, or Firm* — Oblon, Spivak, McClelland, Maier & Neustadt, L.L.P.

(57) ABSTRACT

An image forming apparatus includes a storage section that stores programs for carrying out processes, an updating data selection section that selects an updating data for at least one of programs from an updating data group, based on a program that is started or is startable, and an updating section that updates at least one arbitrary program stored in the storage section based on the selected updating data.

9 Claims, 15 Drawing Sheets

U.S. PATENT DOCUMENTS

| | | |
|---|---|---|
| 6,204,928 B1 | 3/2001 | Nakai |
| 6,249,304 B1 | 6/2001 | Sawayama et al. |
| 6,282,396 B1 | 8/2001 | Iwata et al. |
| 6,295,437 B1 | 9/2001 | Hodoshima et al. |
| 6,381,435 B2 | 4/2002 | Shinohara et al. |
| 6,393,241 B1 | 5/2002 | Matsumoto et al. |
| 6,505,022 B2 | 1/2003 | Kosuge et al. |
| 6,507,720 B2 | 1/2003 | Kabumoto et al. |
| 6,854,000 B2 | 2/2005 | Ikegami et al. |
| 6,915,085 B2 * | 7/2005 | Kawaura ............................ 399/8 |
| 6,915,337 B1 * | 7/2005 | Motoyama et al. ........... 709/220 |
| 6,952,535 B2 * | 10/2005 | Kawaura ............................ 399/8 |
| 7,068,386 B2 | 6/2006 | Kawanabe |
| 7,130,069 B1 | 10/2006 | Honma |
| 7,251,812 B1 * | 7/2007 | Jhanwar et al. ................ 717/171 |
| 7,327,488 B2 | 2/2008 | Kawaura |
| 7,370,092 B2 * | 5/2008 | Aderton et al. ............... 709/220 |
| 7,644,288 B2 | 1/2010 | Kawaura et al. |
| 7,725,890 B2 * | 5/2010 | Kawaura ....................... 717/168 |
| 2001/0027517 A1 | 10/2001 | Kato |
| 2001/0047514 A1 | 11/2001 | Goto et al. |
| 2002/0149791 A1 | 10/2002 | Ozawa et al. |
| 2003/0044185 A1 | 3/2003 | Kawaura |
| 2004/0004732 A1 | 1/2004 | Takeda et al. |
| 2005/0062984 A1 | 3/2005 | Ikegami et al. |
| 2005/0273799 A1 * | 12/2005 | Lin ................................ 720/706 |

FOREIGN PATENT DOCUMENTS

| | | |
|---|---|---|
| JP | 8-174922 | 7/1996 |
| JP | 9-167094 | 6/1997 |
| JP | 9-237182 | 9/1997 |
| JP | 11-4315 | 1/1999 |
| JP | 11-282690 | 10/1999 |
| JP | H11-282684 | 10/1999 |
| JP | 2000-056625 A | 2/2000 |
| JP | 2000-132400 | 5/2000 |
| JP | 2000-181295 A | 6/2000 |
| JP | 2000-222311 | 8/2000 |
| JP | 2001-94756 | 4/2001 |
| JP | 2001-117745 | 4/2001 |
| JP | 2001-147815 | 5/2001 |
| JP | 2001-216145 | 8/2001 |
| JP | 2001-268306 | 9/2001 |
| JP | 2002-82806 | 3/2002 |

* cited by examiner

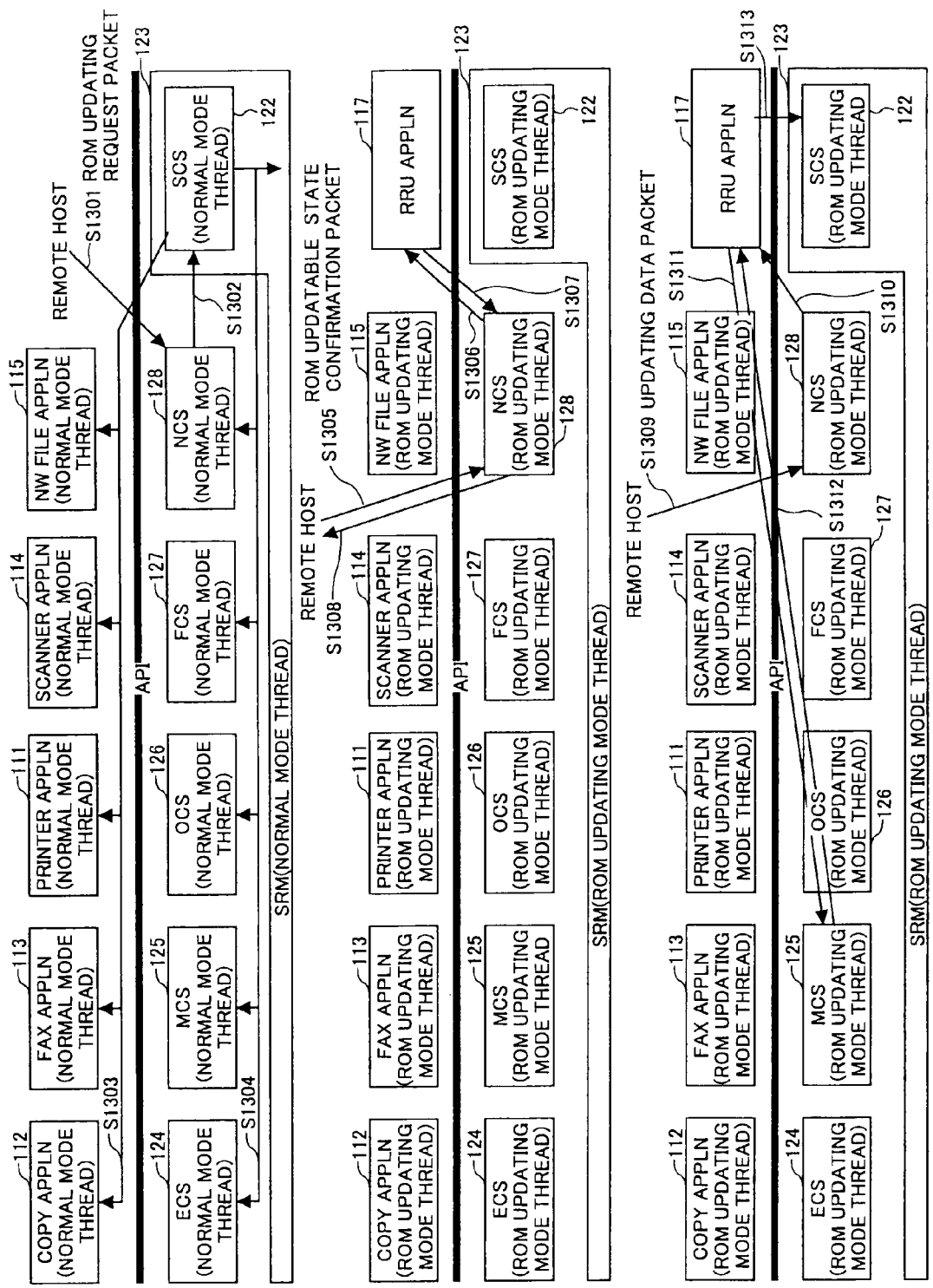

IMAGE FORMING APPARATUS INCLUDING A DEVICE THAT UPDATES STORED PROGRAM BASED ON UPDATING DATA WHICH IS SELECTED BASED ON PROGRAM THAT IS STARTED OR STARTABLE

CROSS REFERENCE TO RELATED APPLICATIONS

This application is a continuation of, and claims the benefit of priority under 35 U.S.C. §120 from, U.S. application Ser. No. 11/000,094, filed Dec. 1, 2004, which is a continuation of U.S. Pat. No. 6,915,085, issued Jul. 5, 2005, which is a continuation of U.S. Pat. No. 6,952,535, issued Oct. 4, 2005, which claims the benefit of priority under 35 U.S.C. §119 from Japanese Patent Applications No. 2001-257043 filed Aug. 27, 2001, and No. 2002-242528 filed Aug. 22, 2002, in the Japanese Patent Office. The entire contents of each of the above applications are incorporated herein by reference.

BACKGROUND OF THE INVENTION

1. Field of the Invention

The present invention generally relates to image forming apparatuses, program updating methods and recording media, and more particularly to an image forming apparatus which rewrites a program stored in a storage section by updating data received via a network, a program updating method for updating the program by the updating data received via the network, and a computer-readable recording medium which stores a computer program for causing a computer to update the program by such a program updating method.

2. Description of the Related Art

Conventionally, apparatuses such as a printing apparatus, a copying machine, a scanner and a facsimile machine, were set up independently. But recently, an image forming apparatus (hereinafter referred to as a composite apparatus) has been developed which includes the functions of a plurality of apparatuses such as the printing apparatus, the copying machine, the scanner and the facsimile machine. The composite apparatus has a display section, a printing section, an image pickup section and the like provided within a single housing. In addition, the composite apparatus is provided with three kinds of software respectively corresponding to the printing apparatus, copying machine and the facsimile machine, and the composite apparatus is operated as the printing apparatus, the copying machine, the scanner or the facsimile machine by switching the kind of software.

In the conventional composite apparatus, the software is provided independently for the functions of each of the printing apparatus, the copying machine, the scanner and the facsimile machine and stored in a non-rewritable read only memory (ROM), and this ROM is mounted on a controller board to realize the various functions.

For this reason, if a function is to be modified or added in the conventional composite apparatus, a new ROM which stores a program reflecting the modification or addition of the new function must be prepared, and the ROM mounted on the controller board must be replaced by this new ROM. As a result, it requires a troublesome operation to carry out the program updating process because of the need to prepare the new ROM which stores the updated program (software) and the need to replace the hardware, that is, to replace the ROM by the new ROM.

Accordingly, a composite apparatus has been proposed, which stores the programs for realizing the functions of each of the printing apparatus, the copying machine, the scanner and the facsimile machine in an electrically rewritable ROM such as a flash memory or flash card, to realize the various functions.

According to this proposed composite apparatus, when modifying or adding the function, the program of the modified or added function is recorded in the flash card as updating data, and the composite apparatus is restarted in a state where this flash card is inserted into a flash card interface of the composite apparatus.

In this state, the composite apparatus reads the updating data from the flash card by an updating program, and the program recorded in the flash card is rewritten by the updating data. Hence, in this proposed composite apparatus, the ROM is updated by utilizing the characteristic of the electrically rewritable flash memory.

For example, a Japanese Laid-Open Patent Application No. 2001-268306 proposes a technique for flexibly coping with the software modification or addition.

On the other hand, an image forming apparatus having a platform was proposed in a Japanese Laid-Open Patent Application No. 2002-82806. The proposed image forming apparatus uses hardware resources such as the display section, the printing section and the image pickup section, and is provided with a plurality of application programs (hereinafter simply referred to as applications) for carrying out processes peculiar to each user service of the printing apparatus, the copying machine and the facsimile machine. The platform is interposed between the applications and the hardware resources. The platform includes various control services for managing the hardware resources which are commonly required by at least two applications, controlling execution and carrying out an image forming process, when providing the user service. The user service refers to a service which is related to the image forming apparatus and is provided with respect to the user. On the other hand, the control service refers to a service which provides a hardware resource related to the image forming process with respect to the application.

According to the proposed image forming apparatus, the platform manages the hardware resources which are commonly required by at least two applications, controls the execution and carries out the image forming process. Hence, it is possible to more easily develop the software for future modification or addition of the applications compared to the conventional composite apparatus, and the functions of the composite apparatus can be expanded with more ease. For this reason, in the proposed image forming apparatus, the need to update the ROM depending on the modification or addition of the functions is extremely high compared to that of the conventional composite apparatus.

For example, only the functions of the printing apparatus, the copying machine and the scanner may originally be used under the terms of a rental contract of the composite apparatus, but the terms of the rental contract may be changed later to allow the functions of the facsimile machine to be used. In such a case, the facsimile application must be added and the addition or modification of the platform becomes necessary due to the addition of the facsimile function.

In the case of the composite apparatus having the platform which carries out the plurality of applications and the common processes, the request to modify or add the functions may occur both irregularly and frequently. Hence, in the case of the conventional program updating method which acquires a flash card every time the program updating process is carried out, and rewrites the program stored in the ROM by reading the updating data from the flash card, it is impossible to quickly cope with the needs for the program updating process which occurs irregularly and frequently. In addition, the program updating method using the flash card requires an extremely troublesome operation to carry out the program updating process, and there is a problem in that the operation efficiency of the program updating process is poor.

The composite apparatus provides composite services including services of the copying machine, the printing machine, the scanner and the facsimile machine. However, the services that can be provided by the composite apparatus is not unified for all of the models of the composite apparatus. For example, some models of the composite apparatus may have all of the functions of the copying machine, the printing machine, the scanner and the facsimile machine, while other models may only have some of the functions such as the facsimile and copy functions. For this reason, the plurality of control services and the plurality of applications operating on a general purpose operating system (OS) naturally differ depending on the functions that may be provided by the composite apparatus.

But according to the conventional composite apparatus, when the flash card is inserted into the composite apparatus as described above and the power of the composite apparatus is turned ON, the updating program is executed immediately without starting the applications and the control services. Consequently, it is impossible to recognize the configuration of the composite apparatus, and there is a problem in that the programs cannot be updated accurately depending on the configuration of the composite apparatus.

For example, assume that a certain composite apparatus has a configuration such that no programs related to the facsimile communication, such as the facsimile application and the facsimile control service, are provided. If the program updating process is carried out with respect to this certain composite apparatus using the flash card which stores the updating data for all programs, there is a possibility that a program within the ROM which does not need to be updated is updated by the program updating process. In this case, the updating of the program which does not need to be updated may generate a failure in the composite apparatus.

Moreover, the technique proposed in the Japanese Laid-Open Patent Application No. 2001-268306 uses a device connected via a predetermined network to acquire and execute a program executed by a multi-function peripheral device, and does not update a program.

SUMMARY OF THE INVENTION

Accordingly, it is a general object of the present invention to provide a novel and useful image forming apparatus, program updating method and computer-readable recording medium, in which the problems described above are eliminated.

Another and more specific object of the present invention is to provide an image forming apparatus, program updating method and computer-readable recording medium which can quickly cope with a program updating process which occurs irregularly and frequently, and easily update programs quickly and accurately.

Still another specific object of the present invention is to provide an image forming apparatus comprising hardware resources used by an image forming process; a storage section which stores one or more programs for carrying out processes of user services and control services related to the image forming process; a network control service which controls a network communication as an arbitrary control service and receives via a network an updating data group including an updating data for at least one of a plurality of programs; a program starting section which starts the arbitrary control service when the network control service receives the updating data group; an updating data selection section which selects an updating data from the updating data group received by the network control service, based on a program of the control service started by or is startable by the program starting section; and an updating section which updates at least one arbitrary program stored in the storage section based on the selected updating data. According to the image forming apparatus of the present invention, it is possible to update the program at an arbitrary time without the need to use a recording medium such as a flash card, because the updating data group including the updating data is received via the network and the program stored in the storage section is updated based on the received updating data. In addition, it is possible to approximately update the program by selecting the necessary updating data depending on the configuration of the program which operates in the image forming apparatus, since the program stored in the storage section is updated based on the updating data which is selected based on the program which is started by or startable by the program starting section. Therefore, it is possible to quickly cope with the program updating process which occurs irregularly and frequently, and easily update programs quickly and accurately by carrying out an optimum program updating process depending on the configuration of the image forming apparatus.

The control services may include a system control service carrying out processes of a normal mode thread which carries out a normal process and a program updating mode thread which carries out a process of selecting the updating data from updating data group received by the started or startable program, the program starting section may start the program updating mode thread of the system control service when the network control service receives the updating data group, and the updating section may update the at least one arbitrary program stored in the storage section based on the updating data selected by the program updating mode thread of the system control service. In this case, the system control service operates as a process having the program updating mode thread, and when the updating data group is received, it is possible to carry out the process of selecting the updating data by starting the program updating mode thread of the system control service. For this reason, the process of one system control service can separate the processes at the time of the normal process and at the time of the program updating by threads, so that it is unnecessary to provide independent processes and the process delay caused by the process starting at the time of the program updating process can be avoided. The starting timing of the program updating mode thread of the system control service by the program starting section may be when the network control service receives the updating data group.

The image forming apparatus may further comprise a memory control service which includes a memory control service carrying out processes of a normal mode thread which carries out a normal process and a program updating mode thread which carries out a process of securing an updating data region in a memory for temporarily storing the updating data group; and a program updating application which develops the received updating data group and stores the updating data group in the updating data region, wherein the program updating application causes the program starting section to start the program updating mode thread of the memory control service when the updating data group is received from the network control service. In this case, the memory control service operates as a process having the program updating mode thread, and when the updating data group is received, it is possible to carry out the process of securing the updating data region by starting the program updating mode thread of the memory control service. For this reason, the process of one memory control service can separate the processes at the time of the normal process and at the time of the program updating by threads, so that it is unnecessary to provide independent processes and the process delay caused by the process starting at the time of the program updating process can be avoided. Moreover, since the received updating data group is developed and the developed updating data group is stored in the updated data region which is secured in the memory, it is unnecessary to read the updating data from a flash card or the like, and the received updating data can be used as it is for the program updating process, thereby facilitating the program updating process. The starting timing of the program updating mode thread of the memory control service by the program starting section may be when the network control service receives the updating data group.

Each of the control services may include a normal mode thread which carries out a normal process and a program updating mode thread which stops processes related to the image forming process, and the program updating application may cause the program starting section to start the program updating mode thread of each of the control services when the updating data group is received from the network control service. In this case, each control service operates as a process having the program updating mode thread, and when the updating data group is received, each program updating mode thread of the control service is started, so that the program updating process can be carried out in a state where the processes related to the image forming process are stopped. For this reason, it is possible to prevent the program updating process from being interrupted or discontinued during the program updating process due to the copying function, the facsimile function or the like which are unnecessary for the program updating, and the program updating process can be carried out quickly.

The program updating application may receive the updating data group from the network control service, and the system control service may stop the normal mode thread which is started and starts the program updating mode thread of each of the control services depending on a request from the program updating application. In this case, the program updating mode thread of each control service is started when the updating data group is received, and thus, the program updating process can be carried out in a state where the processes related to the image forming process are stopped. For this reason, it is possible to prevent the program updating process from being interrupted or discontinued during the program updating process due to the copying function, the facsimile function or the like which are unnecessary for the program updating, and the program updating process can be carried out quickly.

The program updating mode thread of the system control service may acquire starting information of the started or startable program and select the updating data of the at least one arbitrary program based on the starting information and module identification information which is stored in the updating data group for each program. In this case, by selecting the updating data of the started or startable program based on the acquired starting information and the module identification information stored in the updating data group for each program, it is possible to be aware of the configuration of the program which operates in the image forming apparatus from the starting information. In addition, it is possible to select the appropriate updating data from the correspondence of the starting information and the module identification information to quickly carry out an appropriate program updating process.

The program updating mode thread of the system control service may search for a file stored in the storage section to acquire the starting information of the started or startable program and selects the updating data of the at least one arbitrary program based on the acquired starting information.

The program updating mode thread of the system control service may search for a file stored in the storage section to acquire the starting information of the started or startable program and selects the updating data of said at least one arbitrary program based on the acquired starting information. In this case, it is possible to be aware of the program which can operate in the image forming apparatus without actually starting the program, by selecting the updating data for the program based on the acquired starting information. Hence, it is possible to quickly and easily carry out an appropriate program updating process depending on the configuration of the image forming apparatus.

The image forming apparatus may further comprise a model identification information acquiring section which acquires a model identification information which is peculiar to a model of the image forming apparatus, wherein the program updating mode thread of the system control service selects the updating data based on module identification information of the at least one arbitrary program included in the updating data group, the starting information of the at least one arbitrary program, model identification information of a model which can operate the at least one arbitrary program stored for each module identification information, and the model identification information acquired by the model identification information acquiring section. In this case, even in a case where arrangements of the programs which can operate differ among the models of the image forming apparatus, it is possible to use in common a single updating data group which is received for the program updating process of a plurality of models of the image forming apparatus. For this reason, it is possible to prevent the program updating process from being erroneously carried out based on the updating data for a different model of the image forming apparatus, and it is possible to ensure an optimum program updating process for the configuration (or model) of the image forming apparatus. In addition, a transmitting end that transmits the updating data group does not need to transmit different updating data for the image forming apparatuses of each of the contractors, and the program updating operation is also facilitated for the transmitting end.

The updating data group may be recorded with an updating destination region of the storage section where the updating data is written for each module identification information, and the updating section may update the arbitrary program from the updating destination region of the storage section based on the selected updating data. In this case, it becomes unnecessary to carry out a process of determining the arrangement and updating destination of the program stored in the storage section, by updating the updating destination region of the storage section by the updating data. Hence, it is possible to carry out the program updating process accurately and quickly.

The recording medium may be recorded with the updating destination region for each model identification information. In this case, it is possible to accurately and quickly carry out the program updating process for a plurality kinds of models of the image forming apparatus, even in a case where the arrangements of the programs which can operate differ depending on the model of the image forming apparatus, because the updating destination region is recorded for each model identification information.

The updating section may check the at least one arbitrary program after being updated by comparing the updated arbitrary program and the updating data. In this case, it is possible to quickly detect an error which occurs during the program updating process, and the reliability of the program updating process can be improved.

The image forming apparatus may further comprise a non-volatile memory which stores updating information related to a program updating process, wherein the updating section stores the updating information in the non-volatile memory when carrying out the program updating process and judges whether or not the updating information is stored in the non-volatile memory prior to the program updating process, so as to update the at least one arbitrary program based on the updating information stored in the non-volatile memory if the updating information is stored in the non-volatile memory. In this case, it is possible to restore the updating information the next time the program updating process is started, even if the program updating process is discontinued halfway. Moreover, the program updating process can quickly be resumed the next time the program updating process is started, from the point where the previous program updating process was discontinued, and the program updating process can be continued smoothly after the discontinuance.

The program updating application may be started before the network control service receives the updating data group via the network. In this case, the updating data group received via the network by the network control service can quickly be transferred to the program updating application.

A further object of the present invention is to provide a program updating method for updating at least one arbitrary one of a plurality of programs stored in a storage section of an apparatus based on updating data received via a network, comprising a receiving step which receives via the network an updating data group including the updating data; a program starting step which starts the at least one arbitrary program in the apparatus; an updating data selection step which acquires starting information of the program which is started by or startable by the program starting step, and selects the updating data corresponding to the at least one arbitrary program, based on the acquired starting information and module identification information which is stored in the updating data group for each program; and an updating step which updates the at least one arbitrary program based on the selected updating data. According to the program updating method of the present invention, it is possible to update the program at an arbitrary time without the need to use a recording medium such as a flash card, because the updating data group including the updating data is received via the network and the program stored in the storage section is updated based on the received updating data. In addition, it is possible to approximately update the program by selecting the necessary updating data depending on the configuration of the program which operates in the image forming apparatus, since the program stored in the storage section is updated based on the updating data which is selected based on the program which is started by or startable by the program starting section. Therefore, it is possible to quickly cope with the program updating process which occurs irregularly and frequently, and easily update programs quickly and accurately by carrying out an optimum program updating process depending on the configuration of the image forming apparatus.

The updating data selection step may be executed by the program which is started in the program updating mode. In this case, it is possible to reduce a size of memory used by the starting program, and improve the speed of the program updating process.

The updating step may update the at least one arbitrary program based on the selected updating data, depending on an updating destination region of the updating data stored for each module identification information in the updating data group. In this case, by updating the program based on the updating data selected according to the updating destination region of the updating data, it becomes unnecessary to carry out a process of determining the arrangement or updating destination of the program stored in the storage section, thereby enabling an accurate and quick program updating process.

Another object of the present invention is to provide a computer-readable storage medium which stores a computer program for causing a computer to update a program which is stored in a storage section, where the computer program comprises a receiving procedure which causes the computer to receives an updating data group including updating data of at least one arbitrary program via a network; a program starting procedure which causes the computer to start the at least one arbitrary program; an updating data selection procedure which causes the computer to acquire starting information of the program which is started by or startable by the program starting procedure, and to select the updating data corresponding to the at least one arbitrary program, based on the acquired starting information and module identification information which is stored in the updating data group for each program; and an updating procedure which causes the computer to update the at least one arbitrary program by carrying out a program updating process based on the selected updating data. According to the computer-readable storage medium of the present invention, it is possible to update the program at an arbitrary time without the need to use a recording medium such as a flash card, because the updating data group including the updating data is received via the network and the program stored in the storage section is updated based on the received updating data. In addition, it is possible to approximately update the program by selecting the necessary updating data depending on the configuration of the program which operates in the apparatus such as the computer, since the program stored in the storage section is updated based on the updating data which is selected based on the program which is started by or startable by the program starting section. Therefore, it is possible to quickly cope with the program updating process which occurs irregularly and frequently, and easily update programs quickly and accurately by carrying out an optimum program updating process depending on the configuration of the apparatus.

Therefore, according to the present invention, it is possible to quickly cope with a program updating process which occurs irregularly and frequently, and easily update programs quickly and accurately.

Other objects and further objects of the present invention will be apparent from the following detailed description when read in conjunction with the accompanying drawings.

BRIEF DESCRIPTION OF THE DRAWINGS

FIGS. 14A, 14B and 14C are block diagrams for explaining an entire processing procedure of a remote ROM updating process in a third embodiment of the image forming apparatus according to the present invention.

DESCRIPTION OF THE PREFERRED EMBODIMENTS

Figure 1:
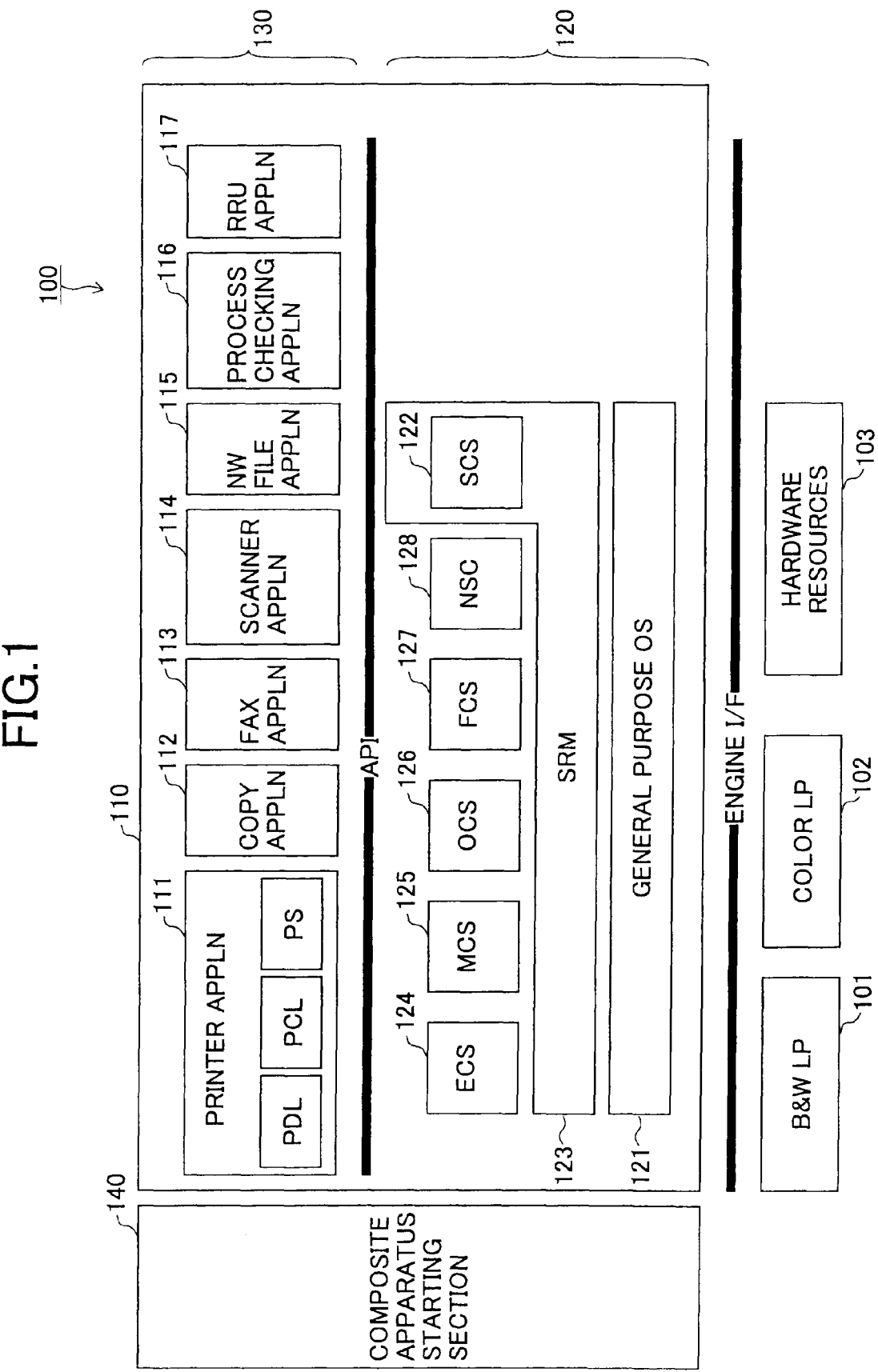
FIG. 1 is a system block diagram showing a functional structure of a first embodiment of an image forming apparatus according to the present invention.

A description will be given of various embodiments of an image forming apparatus, a program updating method and a computer-readable recording medium according to the present invention, by referring to the drawings.

(First Embodiment)

FIG. 1 is a system block diagram showing a functional structure of a first embodiment of the image forming apparatus according to the present invention. A composite apparatus 100 shown in FIG. 1 includes a black and white line printer (B&W LP) 101, a color line printer (Color LP) 102, hardware resources 103 such as a scanner and a facsimile machine, a software group 110, and a composite apparatus starting section 140. The software group 110 is formed by a platform 120 and applications 130. The composite apparatus starting section 140 is executed when turning ON the power of the composite apparatus 100.

The composite apparatus starting section 140 is first executed when turning ON the power of the composite apparatus 100, so as to execute the platform 120 and the applications 130 depending on a starting mode. The starting mode includes a normal mode and a ROM updating mode. The normal mode starts the composite apparatus 100 to carry out normal composite services such as copying, printing, scanning and facsimile functions. The normal mode is started when a remote ROM updating flag in an SRAM 208 shown in FIG. 2 which will be described later is set to an OFF state. On the other hand, the ROM updating mode starts the composite apparatus 100 to update a storage section such as a flash memory. The ROM updating mode is started when the remote ROM updating flag in the SRAM 208 is set to an ON state.

The platform 120 manages control services which generate hardware resource acquisition requests by interpreting processing requests from the applications 130, and one or a plurality of hardware resources 103. The platform 120 includes a system resource manager (SRM) 123 which carries out arbitration of the acquisition requests from the control services, and a general purpose operating system (OS) 121.

The control services are formed by a plurality of service modules, including a system control service (SCS) 122, an engine control service (ECS) 124, a memory control service (MCS) 125, an operation panel control service (OCS) 126, a facsimile control service (FCS) 127, and a network control service (NCS) 128. The platform 120 includes an application program interface (API) which enables reception of the processing requests from the applications 130 using a predefined function.

The general purpose OS 121 is formed by a UNIX (registered trademark) operating system or the like which executes in parallel each software of the platform 120 and the applications 130 as processes.

The MCS 125 is started as a memory control process. The process of the MCS 125 includes a normal mode thread, and a ROM updating mode thread. The normal mode thread of the MCS 125 is executed when carrying out the composite services of the copying machine, printing apparatus (printer), facsimile machine and scanner, such as releasing acquisition of an image memory, utilization of the HDD and compression and expansion of image data. The ROM updating mode thread of the MCS 125 secures an updating data region in the SDRAM 203 for storing updating data developed from an updating data packet by a remote ROM updating application which will be described later, when the composite apparatus 100 is started in the ROM updating mode. The updating data packet forms an updating data group of the present invention.

The updating data includes program data for modifying or adding functions of a program of a user service or a control service. On the other hand, the updating data is grouped for one or a plurality of user services or control services which are updating targets, so as to form the updating data group. The updating data group may include header information in addition to the updating data itself. The header information may include module identification information of the program corresponding to the updating data, model information of the image forming apparatus, updating destination address of the updating data in the storage section, and relative address of the updating data.

The process of the OCS 126 includes a normal mode thread and a ROM updating mode thread. The normal mode thread of the OCS 126 is started when carrying out the composite services such as controlling an operation panel which forms an information transfer means (or section) between the operator (user) and the main body control of the composite apparatus 100. The ROM updating mode thread of the OCS 126 does not carry out the operation panel control, and is simply started.

The process of the FCS 127 includes a normal mode thread and a ROM updating mode thread. The normal mode thread of the FCS 127 is started when carrying out the composite service to provide the API for facsimile transmission and reception using a PSTN and/or an ISDN from each application layer of the system controller, registration or referral to various facsimile data managed in a backup SRAM (BKM), facsimile reception printing, and united transmission and reception. The ROM updating mode thread of the FCS 127 does not execute such functions for providing the API, and is simply started.

The process of the NCS 128 provides services which may be used in common with respect to the applications which require the network I/O interface. The process of the NCS 128 includes a normal mode thread and a ROM updating mode thread. The normal mode thread of the NCS 128 is executed when carrying out the composite service to intermediate, such as distributing to the applications the data received from the network according to the protocols and transmitting the data from the applications to the network. The normal mode thread of the NCS 128 also receives a ROM updating request packet of the flash memory from a host computer of a developer who develops the composite apparatus 100 or a third vendor of a developer who develops the applications, for example, where the host computer or the third vendor is connected to the network. The ROM updating mode thread of the NCS 128 receives via the network the updating data packet which includes the updating data of the program in the flash memory from the host computer of the developer who develops the composite apparatus 100 or the third vendor of the developer who develops the programs.

The process of the SRM 123 manages the resources and controls the system together with the SCS 122. The process of the SRM 123 carries out an arbitration depending on requests from an upper layer which uses the hardware resources such as engines of the scanner section and the printer section, memory, hard disk drive (HDD) file, host input/output (I/O) interface (centronics interface (I/F)), network interface (I/F), IEEE1394 interface (I/F), RS232C interface (I/F) and the like. The process of the SRM 123 includes a normal mode thread which is executed when carrying out a composite service for controlling execution, and a ROM updating mode thread which does not manage the resources and is simply started.

More particularly, the normal mode thread of the SRM 123 judges whether or not the requested hardware resource is usable (or not used by another request), and if the requested hardware resource is usable, notifies the upper layer that the requested hardware resource is usable. In addition, the SRM 123 carries out a scheduling of the use of the hardware resources with respect to the requests from the upper layer, and directly executes the requested contents such as paper transport and image formation by the printer engine, securing memory and file generation.

The process of the SCS 122 includes a normal mode thread which is executed when carrying out a composite service such as application management, operation section control, system screen display, light emitting diode (LED) display, resource management and interrupt application control. For example, the normal mode thread of the SCS 122 carries out a process of setting the remote ROM updating flag in the SRAM 208 to the ON state and issuing a restart command with respect to the composite apparatus 100, when the NCS 128 receives the ROM updating request packet via the network.

The process of the SCS 122 includes, separately from the normal mode thread, a ROM updating mode thread which is started only when the composite apparatus 100 is started in the ROM updating mode. When the composite apparatus 100 is started in the ROM updating mode, the ROM updating mode thread of the SCS 122 carries out a process of selecting the updating data depending on the configuration of the applications and the control services which operate in the composite apparatus 100, from the data developed in the SDRAM 203.

The process of the ECS 124 includes a normal mode thread, and a ROM updating mode thread which does not carry out an engine control and is simply started. The normal mode thread of the ECS 124 is executed when carrying out as the composite service the engine control of the hardware resources 103 which include the black and white line printer 101, the color line printer 102, the scanner, the facsimile machine and the like.

As described above, the ROM updating mode thread of each of the ECS 124, the OCS 126, the FCS 127, and the SRM 123 is simply started, so as to indicate the existence of a control service which operates within the composite apparatus 100 when carrying out the ROM updating process. The ROM updating mode thread of each of the MCS 125, the SCS 122 and the NCS 128 carries out the process required to carry out the ROM updating process, and is started to indicate the existence of the control service which operates within the composite apparatus 100.

The applications 130 include a remote ROM updating (RRU) application 117, a process checking application 116, a network file application 115, a scanner application 114, a facsimile application 113, a copy application 112, and a printer application 111 in page description language (PDL), PCL and postscript (PS). The printer application 111 is used by the printer. The copy application 112 is used by the copying machine. The facsimile application 113 is used by the facsimile machine. The scanner application 114 is used by the scanner. The network file application 115 is used by a network file. The process checking application 116 is used for process checking. The RRU application 117 develops the updating data in the SRAM 208.

Each of the applications 111 through 117 is started as a process, similarly to the platform 120. The process of the RRU application 117 may be started when the composite apparatus 100 is started in the ROM updating mode. The applications 130 form the user services of the present invention.

For example, the RRU application 117 may be started by a program starting section which will be described later, when the NCS 128 receives the ROM updating request packet and the composite apparatus 100 is restarted in the ROM updating mode. In addition, the RRU application 117 may also be started when the composite apparatus 100 is started in the normal mode, similarly to the platform 120.

The RRU application 117 develops the updating data packet received via the network by the NCS 128, and stores the updating data in the updating data region of the SDRAM 203 secured by the ROM updating mode thread of the MCS 125.

Figure 2:
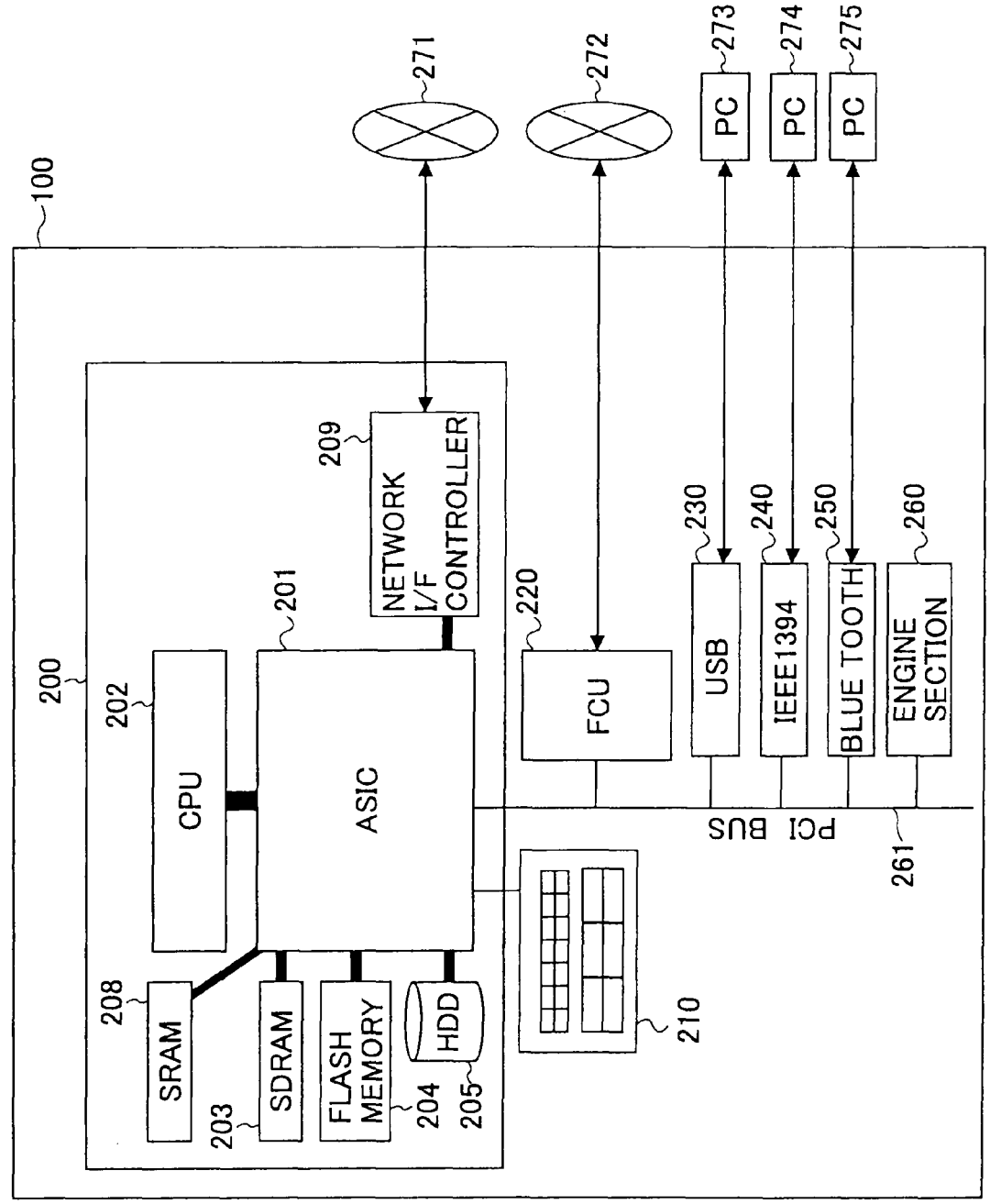
FIG. 2 is a system block diagram showing a hardware structure of the first embodiment of the image forming apparatus.

FIG. 2 is a system block diagram showing a hardware structure of the first embodiment of the image forming apparatus. As shown in FIG. 2, the composite apparatus 100 includes a controller board 200, an operation panel 210, a facsimile control unit (FCU) 220, a USB device 230, an IEEE1394 device 240, a blue tooth device 250, and an engine section 260.

The controller board 200 shown in FIG. 2 includes an ASIC 201, a CPU 202, the SDRAM 203, a flash memory 204, a HDD 205, the SRAM 208, and a network interface controller 209.

The operation panel 210 is directly connected to the ASIC 201. The PCU 220, the USC device 230, the IEEE1394 device 240, the blue tooth device 250 and the engine section 260 are connected to the ASIC 201 via a PCI bus 261.

The network interface controller 209 communicates with other deices connected to a network 271 using a MAC address or the like. The FCU 220 is connected to a telephone network 272. In addition, the USB device 230, the IEEE1394 device 240 and the blue tooth device 250 are connected to other terminals 273 through 275.

The SRAM 208 is a non-volatile memory having a region for storing the remote ROM updating flag which is set to the ON state when the ROM updating request packet is received, and the updating data region for storing the updating data which is developed from the updating data packet when the updating data packet is received via the network 271 after receiving the ROM updating request packet. In addition, the SRAM 208 forms a non-volatile storage means (or section) of this embodiment. The non-volatile storage means may be formed by any non-volatile memory which is backed up by a battery, so as to store various information which is being updated for process recovery, when the power is disconnected during the ROM updating process.

The flash memory (hereinafter referred to as a flash ROM) 204 stores each application, each control service forming the platform 120, and each program of the SRM 123. In this first embodiment, the composite apparatus 100 is forwarded in a state where each program is preinstalled in the flash ROM 204. The composite apparatus 100 carries out a remote ROM updating process to rewrite or update one or more programs in the flash ROM 204 upon receipt of the ROM updating request packet.

The flash ROM 204 forms a storage means (or section) of this embodiment. The storage means (or section) is of course not limited to the flash ROM 204, and may be formed by the SDRAM 203, the HDD 205 or the like.

Figure 3:
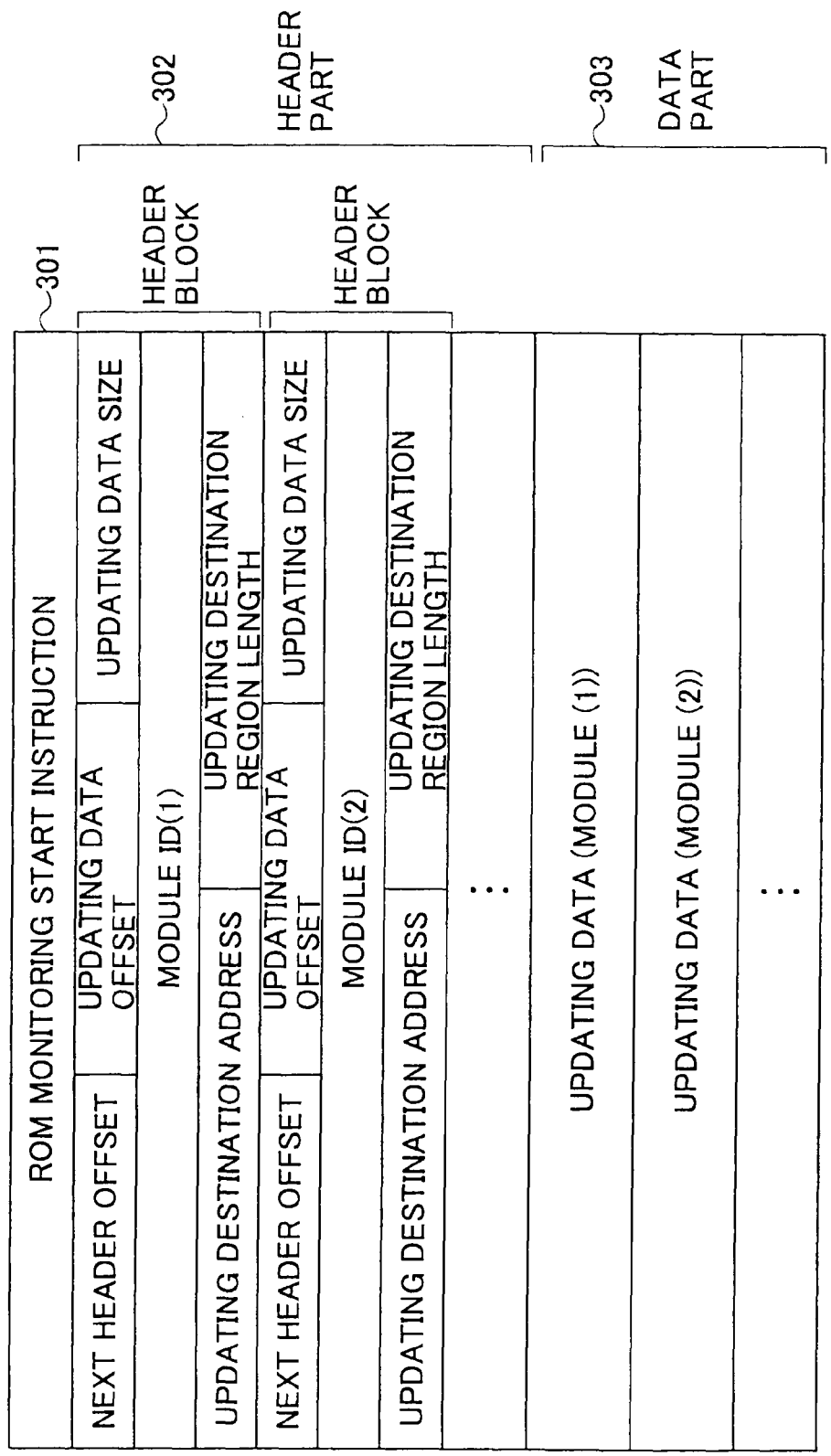
FIG. 3 is a diagram showing a data structure employed by an updating data packet received by the first embodiment of the image forming apparatus after developing the updating data packet.

FIG. 3 is a diagram showing a data structure employed by the updating data packet after the updating data packet received by the NCS 128 via the network 271 is developed. The developing of the updating data packet refers to a process of eliminating network information such as a destination network address and a packet length from the updating data packet, so as to enable reference to the data which is necessary for the ROM updating process.

As shown in FIG. 3, the developed updating data packet includes a ROM monitoring start instruction 301 at the beginning, a header part 302, and a data part 303. The ROM monitoring start instruction 301 is referred to when starting the composite apparatus 100 and starts the ROM monitoring process which will be described later.

The header part 302 is divided into header blocks for each of the modules, so as to corresponding to the modules to be updated. Each header block includes a next header offset which indicates an offset to the next header block, an updating data offset which indicates an offset to the updating data of the module, a size of the updating data, a module identification (ID) which indicates identification information of the module, an updating destination address which indicates a relative address of the module in the flash ROM 204, and an updating destination region length which indicates the size of the module.

The module can be updated in units of programs which may be in units of control services such as the MCS 125, the ECS 124 and the NCS 128, in units of applications such as the printer application 111 and the copy application 112, and in units of engines such as the printer engines 101 and 102 and the scanner engine. In addition, the updating data is obtained by compressing binary data of an updating program with respect to each of such modules. The updating data which is compressed, is expanded when being developed by the RRU application 117.

The data part 303 is recorded next to the header part 302, and the updating data is stored in the data part 303 for each module. The beginning of the updating data of each module can be referred to by the updating data offset of the header block corresponding to the module.

Figure 4:
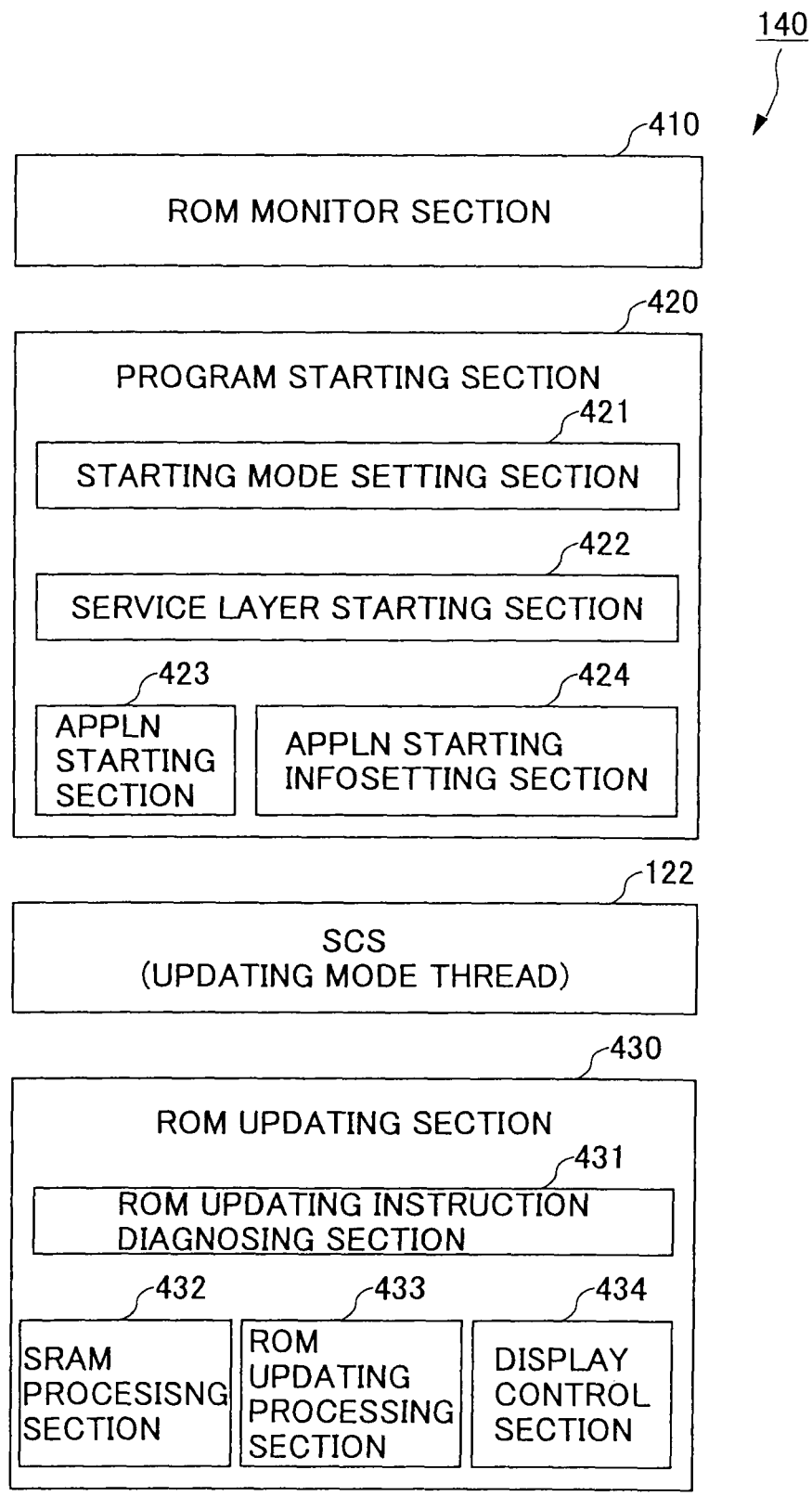
FIG. 4 is a system block diagram showing a structure of a composite apparatus starting section of the first embodiment of the image forming apparatus.

FIG. 4 is a system block diagram showing a structure of the composite apparatus starting section 140 of the first embodiment of the image forming apparatus. In this first embodiment, the composite apparatus starting section 140 of the composite apparatus 100 includes a ROM monitor section 410, a program starting section 420, an SCS 122 which started the ROM updating mode thread, and a ROM updating section 430 as shown in FIG. 4. The ROM monitoring section 410, the program starting section 420 and the ROM updating section 430 are stored in the flash ROM 204.

The program starting section 420 forms a program starting means (or section), the SCS 122 forms an updating data selection means (or section), and the ROM updating section 430 forms an updating means (or section) of this embodiment.

The ROM monitoring section 410 is started by executing the ROM monitoring start instruction recorded at the beginning of the updating data packet. The ROM monitoring section 410 carries out processes such as initializing the hardware, diagnosing the controller board 200, initializing the software and starting the general purpose OS 121.

The program starting section 420 is called by the general purpose OS 121. The program starting section 420 includes a starting mode setting section 421, a service layer starting section 422, an application starting section 423, and an application starting information setting section 424.

The starting mode setting section 421 checks the remote ROM updating flag stored in the SRAM 208, and sets the starting mode to the normal mode or the ROM updating mode. The service layer starting section 422 acquires the starting information of the general purpose OS 121, and starts the control service. The application starting information setting section 424 is executed in the case of the ROM updating mode. The application starting information setting section 424 acquires the starting information of each application, and sets the acquired application starting information to environment variables. The application starting section 423 is executed in the case where the starting mode is the normal mode. The application starting section 423 acquires the starting information of each application, and starts each application.

The starting information may be any information capable of identifying the program of the user service and the control service. For example, a program name, a program ID or the like may be used for the starting information. On the other hand, the module identification information may be any information capable of identifying the program of the user service or control service which is the target of updating to be carried out based on the updating data. For example, a program name, a program ID or the like may be used for the module identification.

The ROM updating mode thread of the SCS 122 is started together with other control services by the service layer starting section 422 of the program starting section 420. In the ROM updating mode thread of the SCS 122, the control services and applications operating in the composite apparatus 100 are judged, and the updating data is selected from the updating data received via the network 271 depending on the configuration of the composite apparatus 100. In addition, the ROM updating mode thread of the SCS 122 starts the ROM updating section 430, and issues with respect to the ROM updating section 430 a ROM updating instruction together with the information of the selected updating data.

The ROM updating section 430 is started by the ROM updating mode thread of the SCS 122, receives the ROM updating instruction from the SCS 122, and rewrites the flash ROM 204 by the updating data. The ROM updating section 430 includes a ROM updating instruction diagnosing section 431, a ROM updating processing section 433, an SRAM processing section 432, and a display control section 434. The ROM updating instruction diagnosing section 431 diagnoses the ROM updating instruction from the SCS 122. The ROM updating processing section 433 rewrites or updates the program in the flash ROM 204 based on the updating destination address and the diagnosed ROM updating instruction. The SRAM processing section 432 stores various information which are being updated by the ROM updating process into the SRAM 208. The display control section 434 controls display of the progress of the ROM updating process which is being carried out, to the user.

Figure 5:
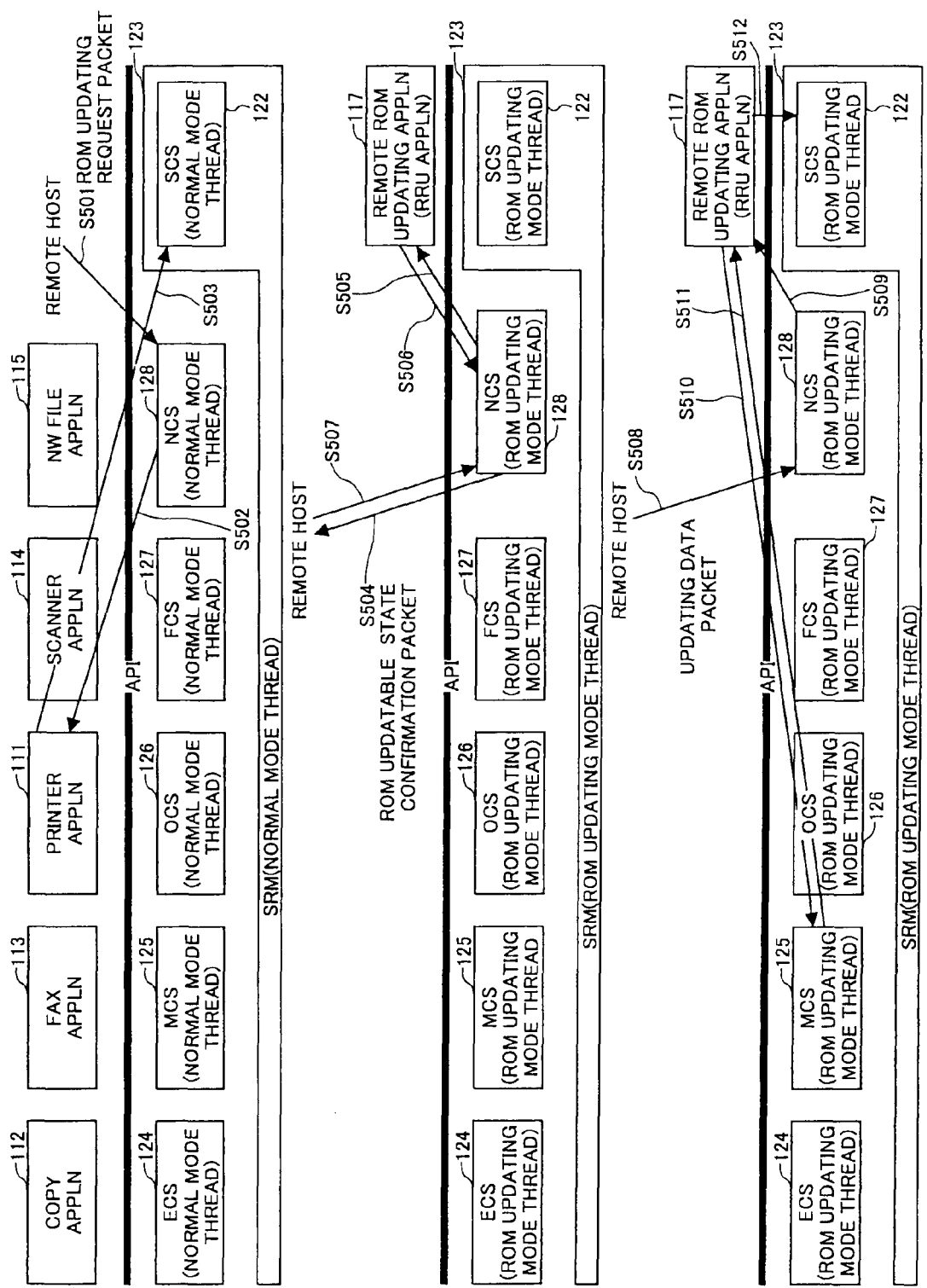
FIGS. 5A, 5B and 5C are block diagrams for explaining an entire processing procedure of a remote ROM updating process in the first embodiment of the image forming apparatus.

Next, a description will be given of the remote ROM updating process of the composite apparatus 100 having the structure described above. FIGS. 5A, 5B and 5C are block diagrams for explaining an entire processing procedure of the remote ROM updating process in the first embodiment of the image forming apparatus, that is, the composite apparatus 100. In FIGS. 5A through 5C, those parts which are the same as those corresponding parts in FIG. 1 are designated by the same reference numerals, and a description thereof will be omitted.

FIG. 5A shows the operation that is carried out when the composite apparatus 100 receives the ROM updating request. FIG. 5B shows the operation of confirming the restart, when the composite apparatus 100 is restarted after receiving the ROM updating request. In addition, FIG. 5C shows the operation that is carried out when the composite apparatus 100 receives the updating data packet.

In FIG. 5A, when the composite apparatus 100 carries out the operation of the normal composite service, each application and each control service execute the normal mode thread.

In this state, when the ROM updating request packet is received from a remote host via the network 271, the normal mode thread of the NCS 128 advances to a step S501 and receives this ROM updating request packet. The remote host may be a host computer of a developer who develops the composite apparatus 100 or, a third vendor of a developer who develops the applications.

In a step S502, the normal mode thread of the NCS 128 judges the contents of the received packet, and if the received packet is the ROM updating request packet, notifies the existence of the ROM updating request to the printer application 111.

In a step S503, when the printer application 111 receives the notification from the NCS 128 indicating the existence of the ROM updating request, the printer application 111 sends a restart or reboot request notification of the composite apparatus 100 with respect to the normal mode thread of the SCS 122. The normal mode thread of the SCS 122 which receives the reboot request notification sets the remote ROM updating flag stored in the SRAM 208 to the ON state, and thereafter issues a restart command to restart the composite apparatus 100.

Figure 6:
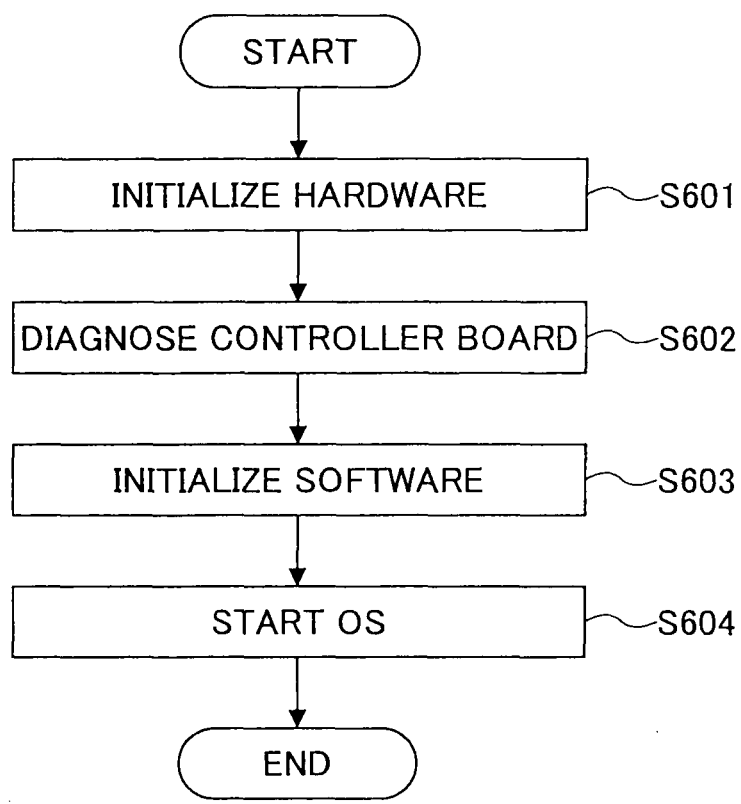
FIG. 6 is a flow chart for explaining a processing procedure carried out by a ROM monitoring section of the first embodiment of the image forming apparatus.

When the composite apparatus 100 is restarted, the ROM monitoring section 410 recorded at a boot vector of the flash ROM 204 is started. FIG. 6 is a flow chart for explaining a processing procedure carried out by the ROM monitoring section 410 of the first embodiment of the image forming apparatus, that is, the composite apparatus 100.

In a step S601 shown in FIG. 6, the ROM monitoring section 410 first carries out an initializing process to initialize the hardware. In a step S602 after the step S601, the ROM monitoring section 410 executes a diagnosing process with respect to the controller board 200. Then, in a step S603, the ROM monitoring section 410 carries out an initializing process to initialize the software. The process advances to a step S604 after the step S603, and the step S604 finally starts the general purpose OS 121.

Figure 7:
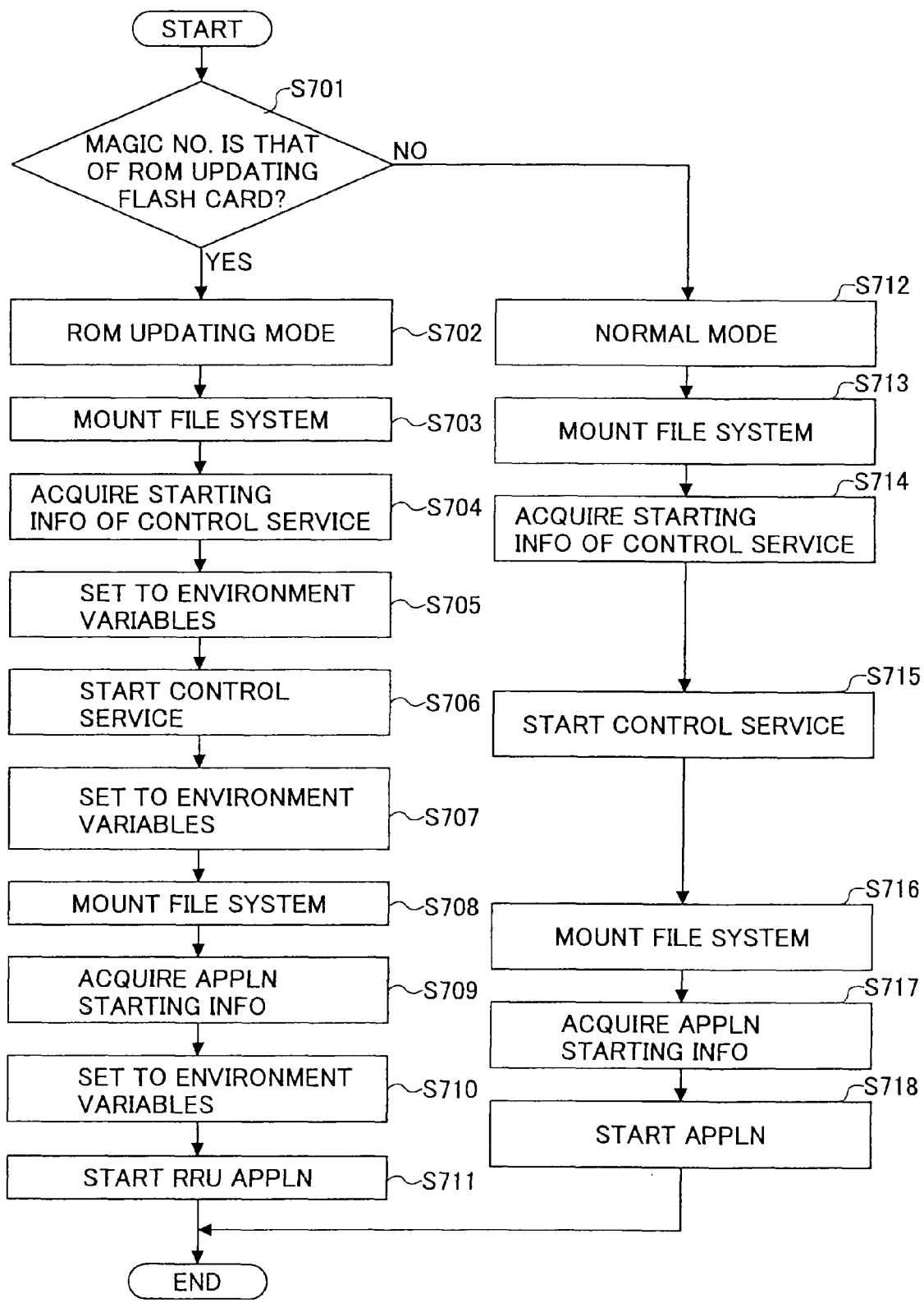
FIG. 7 is a flow chart for explaining a processing procedure of a process carried out by a program starting section of the first embodiment of the image forming apparatus.

FIG. 7 is a flow chart for explaining a processing procedure of the process carried out by the program starting section 420 of the first embodiment of the image forming apparatus, that is, the composite apparatus 100. In a step S701 shown in FIG. 7, the program starting section 420 checks the state of the remote ROM updating flag stored in the SRAM 208 by the starting mode setting section 421.

If the step S701 judges that the remote ROM updating flag is in the ON state, the process advances to a step S702, and the starting mode setting section 421 carries out the following process by setting the starting mode to the ROM updating mode.

In a step S703 after the step S702, the service layer starting section 422 mounts a file system of the flash ROM 204. In a step S704 after the step S703, the service layer starting section 422 acquires the starting information of the control services such as the SCS 122, the ECS 124 and the MCS 125 from the flash ROM 204. In a step S705, the service layer starting section 422 sets the starting information acquired in the step S704 to the environment variables.

In a step S706 after the step S705, the service layer starting section 422 starts the control services such as the SCS 122, the ECS 124 and the MCS 125 on the general purpose OS 121. In this state, each control service starts the ROM updating mode thread thereof. Accordingly, the ROM updating mode thread is started in the process of the SCS 122.

In a step S707, the service layer starting section 422 sets the control service starting information of the control service which is started to the environment variables if the ROM updating mode thread of the SCS 122 is started.

The control service starting information includes a process ID, a module name and the like of the control service which is started, and is used to identify the program of the control service. The control service starting information is peculiar to each control service.

In a step S708 after the step S707, the application starting information setting section 424 mounts a file system of the flash ROM 204. In a step S709 after the step S708, the application starting information setting section 424 searches for the mounted file system and extracts the program of the application, so as to acquire the application starting information of the application which is started in the composite apparatus 100. In a step S710, the application starting information setting section 424 sets the application starting information acquired in the step S709 to the environment variables.

The application starting information is peculiar to the application and is used to identify the application which can operate in the composite apparatus 100. The application starting information includes a module ID, a module name and the like of the application. In the ROM updating mode, only the control service is started and the application is not started. In addition, the control service starting information and the application starting information set to the environment variables are transferred to the SCS 122. The program is started in the ROM updating mode in this manner. Further, in a step S711 after the step S710, the application starting section 423 starts the RRU application 117.

If the step S701 judges that the remote ROM updating flag is in the OFF state, the process advances to a step S712. In the step S712, the starting mode setting section 421 carries out the following process by setting the starting mode to the normal mode.

In a step S713 after the step S712, the service layer starting section 422 mounts a file system of the flash ROM 204. In a step S714 after the step S713, the service layer starting section 422 acquires the starting information of the control services such as the SCS 122, the ECS 124 and the MCS 125. In a step S715 after the step S714, the service layer starting section 422 starts the control services such as the SCS 122, the ECS 124 and the MCS 125 on the general purpose OS 121. In this state, the process of each control service starts the normal mode thread thereof.

In a step S716 after the step S715, the application starting section 423 mounts a file system of the flash ROM 204. In a step S717 after the step S716, the application starting section 423 acquires the application starting information of the application which operates in the composite apparatus 100 from the mounted file system. In a step S718, the application starting section 423 starts each application. In this state, the RRU application 117 is not started.

In FIG. 5B, the composite apparatus 100 receives via the network 271 a ROM updatable state confirmation packet from the remote host (the host computer of the developer who develops the composite apparatus 100 or, the third vendor of the developer who develops the applications) that made the ROM updating request.

In a step S504 shown in FIG. 5B, the ROM updating mode thread of the NCS 128 receives the ROM updatable state confirmation packet because the control service and the RRU application 117 are started in the composite apparatus 100. In a step S505, the ROM updating mode thread of the NCS 128 transfers the received ROM updatable state confirmation packet to the RRU application 117.

In this state, the ROM updating process is possible because the composite apparatus 100 is restarted in the ROM updating mode. In a step S506, the RRU application 117 sends to the NCS 128 a remote ROM updatable message which indicates that the remote ROM updating process is possible, as a response message with respect to the ROM updatable state confirmation packet. In a step S507, the ROM updating mode thread of the NCS 128 sends the remote ROM updatable message via the network 271 to the remote host that is the transmitting source of the ROM updatable state confirmation packet.

When the NCS 122 sends to the remote host the response with respect to the ROM updatable state confirmation packet, the remote host sends the updating data packet as shown in FIG. 5C. Hence, in a step S508 shown in FIG. 5C, the composite apparatus 100 receives the updating data packet from the remote host by the ROM updating mode thread of the NCS 128. In a step S509, the ROM updating mode thread of the NCS 128 transfers the received updating data packet to the RRU application 117.

In a step S510, the RRU application 117 requests the MCS 125 to secure the updating data region in the SDRAM 203 by making a region secure request, in order to obtain the necessary region for the updating data packet which is developed. In a step S511, the ROM updating mode thread of the MCS 125, which receives the region secure request, secures the updating data region in the SDRAM 203, and returns to the RRU application 117 a starting address of the secured updating data region and the secured region size.

In the RRU application 117, the network information is removed, and the updating data packet is developed from the starting address of the updating data region notified from the ROM updating mode thread of the MCS 125, by expanding the updating data packet in the compressed form. As a result, the updating data packet having the data structure shown in FIG. 3 is stored in the updating data region of the SDRAM 203.

In a step S512, the RRU application 117 notifies to the SCS 122 the starting address of the updating data region in the SDRAM 203 where the updating data packet is developed. Consequently, the updating data selection process is carried out by the ROM updating mode thread of the SCS 122.

Figure 8:
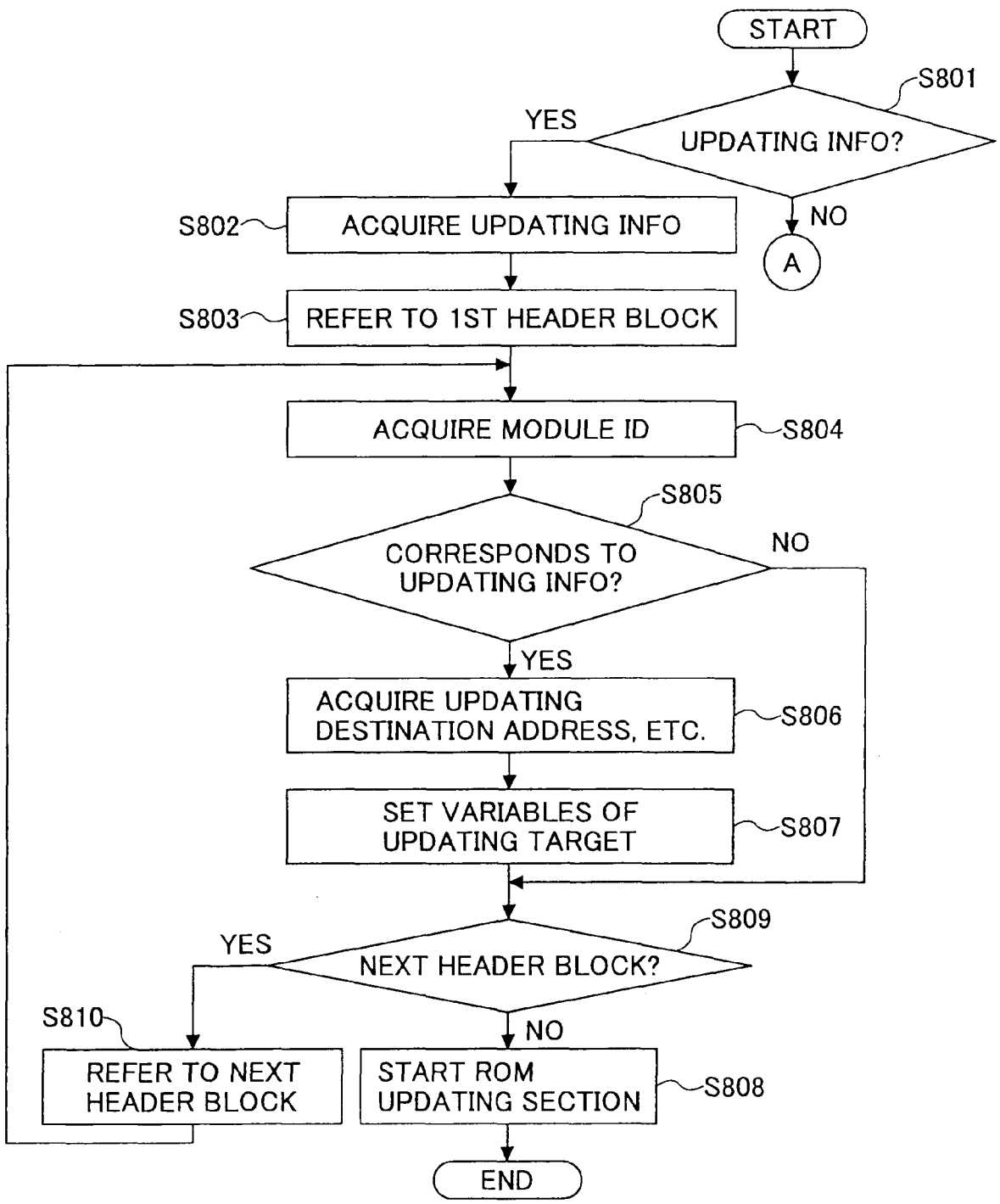
FIG. 8 is a flow chart for explaining a processing procedure of an updating data selection process carried out by a ROM updating mode thread of a SCS in the first embodiment.
Figure 9:
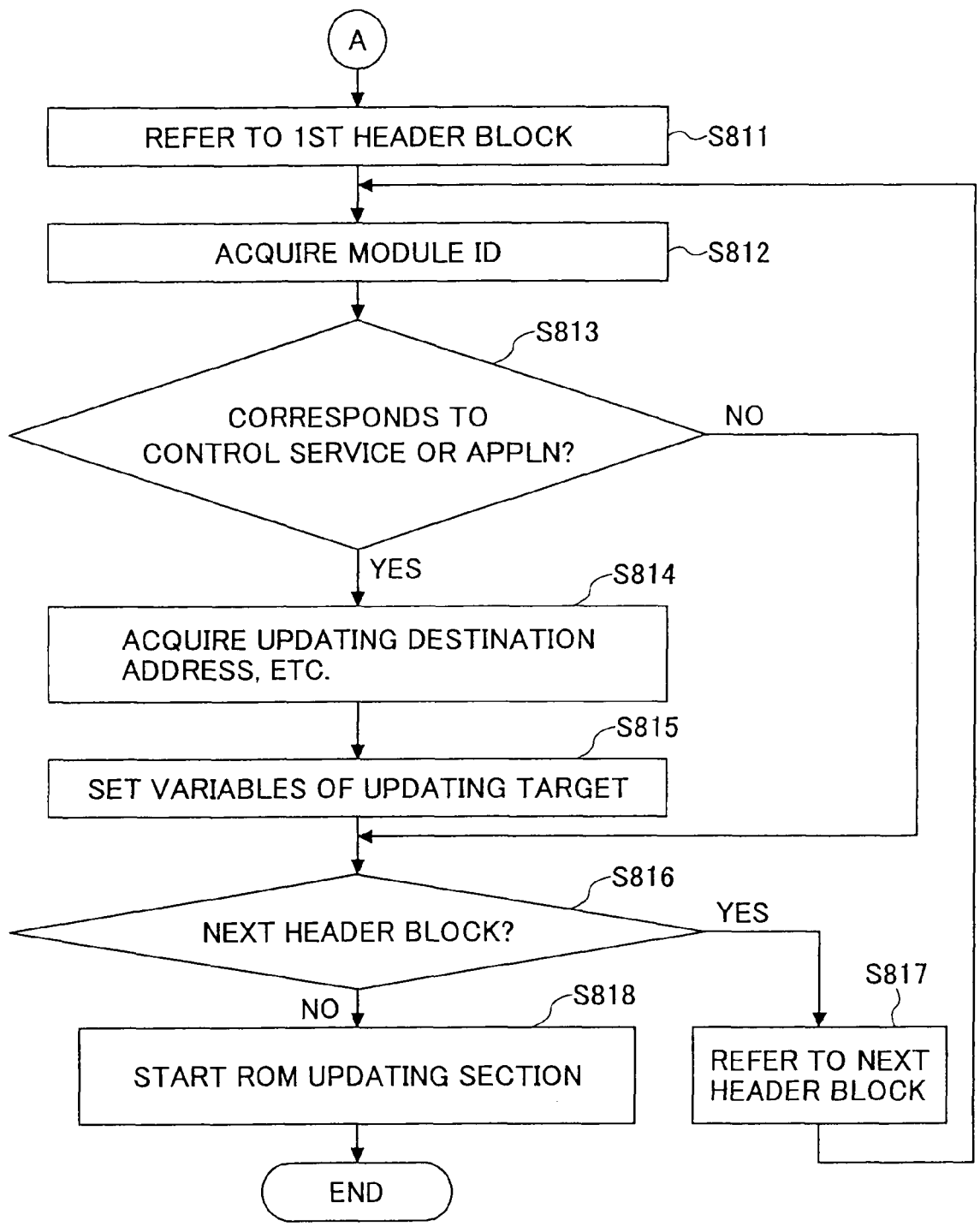
FIG. 9 is a flow chart for explaining the processing procedure of the updating data selection process carried out by the ROM updating mode thread of the SCS in the first embodiment.

FIGS. 8 and 9 are flow charts for explaining a processing procedure of the updating data selection process carried out by the ROM updating mode thread of the SCS 122 in the first embodiment of the image forming apparatus, that is, the composite apparatus 100.

In a step S801 shown in FIG. 8, the ROM updating mode thread of the SCS 122 confirms whether or not the updating information such as the module ID and the updating destination address of the flash ROM 204 is already stored in the SRAM 208.

If the updating information is stored in the SRAM 208 and the decision result in the step S801 is YES, it is judged that the ROM updating mode thread of the SCS 122 is started after the ROM updating process is discontinued, and the process advances to a step S802. In the step S802, the ROM updating mode thread of the SCS 122 acquires the updating information from the SRAM 208.

In a step S803 after the step S802, the ROM updating mode thread of the SCS 122 makes a reference to a first header block in the flash ROM 204. In a step S804 after the step S803, the ROM updating mode thread of the SCS 122 acquires the module ID from the header block.

In a step S805 after the step S804, the ROM updating mode thread of the SCS 122 judges whether or not the module ID acquired from the header block corresponds to the updating information acquired from the SRAM 208 in the step S802.

If the module ID acquired from the header block corresponds to the updating information acquired from the SRAM 208 and the decision result in the step S805 is YES, the process advances to a step S806. In the step S806, the ROM updating mode thread of the SCS 122 selects the updating data of the acquired module ID, and further acquires from the header block the updating destination address, the updating data offset and the updating data size.

In a step S807 after the step S806, the ROM updating mode thread of the SCS 122 sets a set of updating information made up of the module ID, the updating destination address, the updating data offset and the updating data size to variables of the "updating target", and the process advances to a step S809.

On the other hand, if the module ID acquired from the header block does not correspond to the updating information acquired from the SRAM 208 and the decision result in the step S805 is NO, the ROM updating mode thread of the SCS 122 does not select the updating data of the acquired module ID, and the process advances to the step S809. In other words, the ROM updating mode thread of the SCS 122 does not carry out the processes of the steps S806 and S807.

In the step S809, the ROM updating mode thread of the SCS 122 makes a reference to the next header block offset, and judges whether or not the next header block exists. If the next header block exists and the decision result in the step S809 is YES, the process advances to a step S810. In the step S810, the ROM updating mode thread of the SCS 122 makes a reference to the next header block. Thereafter, the ROM updating mode thread of the SCS 122 repeats the process of the steps S804 through S807 and the steps S809 and S810.

On the other hand, if the next header block does not exist and the decision result in the step S809 is NO, the process advances to a step S808. In other words, when the selection of the updating data for the module ID ends with respect to all of the header blocks, the ROM updating mode thread of the SCS 122 starts the ROM updating section 430 to issue a ROM updating instruction, and transfers the variables of the updating target.

Figure 10:
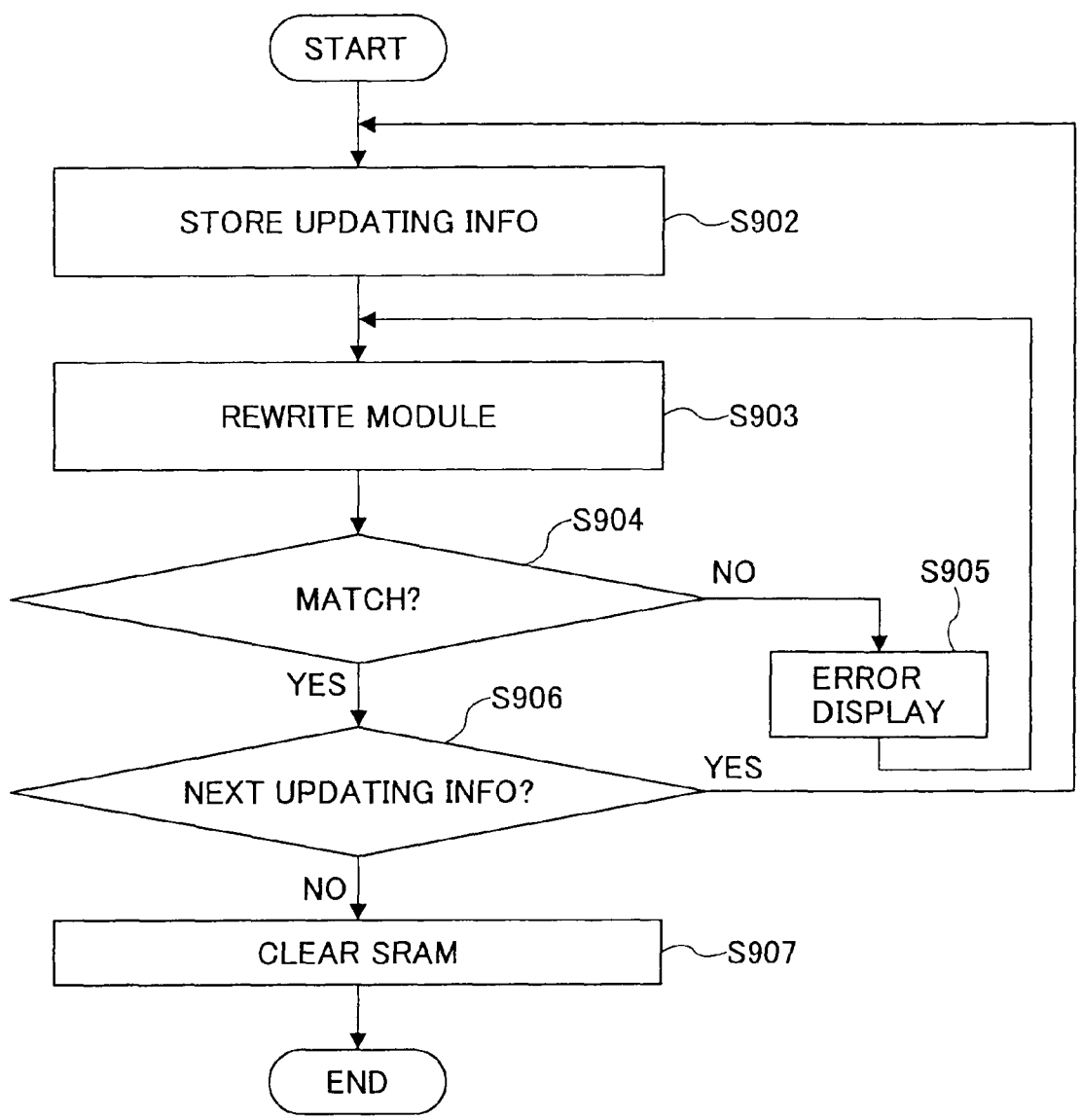
FIG. 10 is a flow chart for explaining a processing procedure of the ROM updating process carried out by a ROM updating section of the first embodiment of the image forming apparatus.

If the updating information does not exist in the SRAM 208 and the decision result in the step S801 is NO, the process of the ROM updating section 430 advances to a step S811 shown in FIG. 10. In the step S811, the ROM updating mode thread of the SCS 122 makes a reference to the first header block of the flash ROM 204. In a step S812 after the step S811, the ROM updating mode thread of the SCS 122 acquires the module ID from the header block.

In a step S813 after the step S812, the ROM updating mode thread of the SCS 122 judges whether or not the module ID acquired from the header block corresponds to the control service or application within the environment variables.

If the module ID acquired from the header block corresponds to the control service or application within the environment variables and the decision result in the step S813 is YES, the process advances to a step S814.

In the step S814, the ROM updating mode thread of the SCS 122 selects the updating data of the acquired module ID, and further acquires from the header block the updating destination address, the updating data offset and the updating data size.

In a step S815 after the step S814, the ROM updating mode thread of the SCS 122 sets a set of updating information made up of the module ID, the updating destination address, the updating data offset and the updating data size to variables of the "updating target", and the process advances to a step S816.

On the other hand, if the module ID acquired from the header block does not correspond to the control service or application within the environment variables and the decision result in the step S813 is NO, the ROM updating mode thread of the SCS 122 does not select the updating data of the acquired module ID, and the process advances to the step S816. In other words, the ROM updating mode thread of the SCS 122 does not carry out the processes of the steps S814 and S815.

In the step S816, the ROM updating mode thread of the SCS 122 makes a reference to the next header block offset, and judges whether or not the next header block exists. If the next header block exists and the decision result in the step S816 is YES, the process advances to a step S817. In the step S817, the ROM updating mode thread of the SCS 122 makes a reference to the next header block. Thereafter, the ROM updating mode thread of the SCS 122 repeats the process of the steps S812 through S817.

On the other hand, if the next header block does not exist and the decision result in the step S816 is NO, the process advances to a step S818. In other words, when the selection of the updating data for the module ID ends with respect to all of the header blocks, the ROM updating mode thread of the SCS 122 starts the ROM updating section 430 to issue a ROM updating instruction, and transfers the variables of the updating target.

Accordingly, the updating data of the module existing within the composite apparatus 100 is selected from the updating data supplied from the remote host.

FIG. 10 is a flow chart for explaining a processing procedure of the ROM updating process carried out by the ROM updating section 430 of the first embodiment of the image forming apparatus, that is, the composite apparatus 100.

In a step S902 shown in FIG. 10, the ROM updating section 430 stores the first set of updating information (module ID, version information, updating destination address, updating data offset and updating data size) in the SRAM 208, based on the variables of the updating target received from the SCS 122, and the process advances to a step S903. By carrying out the process of the step S902, it is possible to execute again the processes of the step S504 and the subsequent steps shown in FIG. 5B when started the next time, even when the updating process is discontinued due to generation of an error.

In the step S903, the ROM updating section 430 reads as the updating data the data amounting to the updating data size from the address indicated by the updating data offset from the starting address of the SDRAM 203. In addition, the step S903 updates the module starting from the updating destination address in the flash ROM 204 based on the updating data.

In a step S904 after the step S903, the ROM updating section 430 compares the updating data in the SDRAM 203 and the data of the module in the flash ROM 204 updated in the step S903, and checks whether or not the compared data match. If the compared data do not match and the decision result in the step S904 is NO, the process advances to a step S905. In the step S905, the ROM updating section 430 makes an error display to indicate that the updating process (rewriting process) was unsuccessful, and the process returns to the step S903. In this case, the ROM updating section 430 carries out the rewriting process (updating process) again. On the other hand, if the compared data match and the decision result in the step S904 is YES, the ROM updating section 430 judges that the rewriting process (updating process) was successful, and the process advances to a step S906.

In the step S906, the ROM updating section 430 judges whether or not the next set of updating information exists in the variables of the updating target. If the next set of updating information exists and the decision result in the step S906 is YES, the process returns to the step S902, and the process of the steps S902 through S905 is carried out with respect to the next set of updating information. In other words, the ROM updating section 430 repeats the process of the steps S902 through S906 with respect to all updating information received from the SCS 122.

If the next set of updating information does not exist and the decision result in the step S906 is NO, the process advances to a step S907. In the step S907, the ROM updating section 430 clears the SRAM 208 and ends the ROM updating process. In other words, the ROM updating section 430 clears the SRAM 208 and ends the ROM updating process when the rewriting of all of the modules which are the updating target and received from the SCS 122 ends.

Therefore, according to this first embodiment, the NCS 128 receives via the network 271 the ROM updating request packet and then the updating data packet, and the ROM updating section 430 rewrites or updates the program in the flash ROM 204 based on the updating data, so that the ROM updating process (program updating process) can be carried out at an arbitrary time without the use of a flash card or the like.

In addition, according to this first embodiment, the composite apparatus 100 is restarted in the ROM updating mode when the NCS 128 receives the ROM updating request, and the program starting section 420 starts all of the control services which operate in the composite apparatus 100. In addition, the updating data suited for the configuration of the control services and the applications is selected by judging the control services started by the ROM updating mode thread of the SCS 122 and the applications which can be started, so as to rewrite or update the program in the flash ROM 204 based on the selected updating data. For this reason, it is possible to carry out an accurate ROM updating process depending on the configuration of the control services and the applications which operate in the composite apparatus 100.

Furthermore, in the composite apparatus 100 of this first embodiment, the processes of the control services of the SCS 122, the MCS 125 and the like all have the ROM updating mode thread related to the ROM updating process, independently of the normal mode thread for carrying out the composite services. For this reason, only the ROM updating mode thread is started during the ROM updating process, and the ROM updating process can be carried out quickly, because it is possible to prevent the functions of the composite services from being executed which would otherwise interrupt and discontinue the ROM updating process.

(Second Embodiment)

In the ROM updating process of the composite apparatus 100 in the first embodiment described above, the updating data is not prepared for each model of the composite apparatus 100. Consequently, it is necessary for the remote host, such as the host computer of the developer who develops the composite apparatus 100 or the third vendor of the developer who develops the applications, to be aware of the model of the composite apparatus 100 for each contractor, and to send each updating data packet that is appropriate for the model of the composite apparatus 100 of each contractor with respect to the composite apparatus 100 of each contractor.

On the other hand, in a second embodiment of the image forming apparatus of the present invention, a single updating data packet is used in common to carry out the ROM updating process of a plurality of models of the composite apparatus 100. The functional structure and the hardware structure of this second embodiment of the image forming apparatus are the same as the functional structure and the hardware structure of the first embodiment of the image forming apparatus, that is, the composite apparatus 100, shown in FIGS. 1 and 2, and illustration and description thereof will be omitted.

Figure 11:
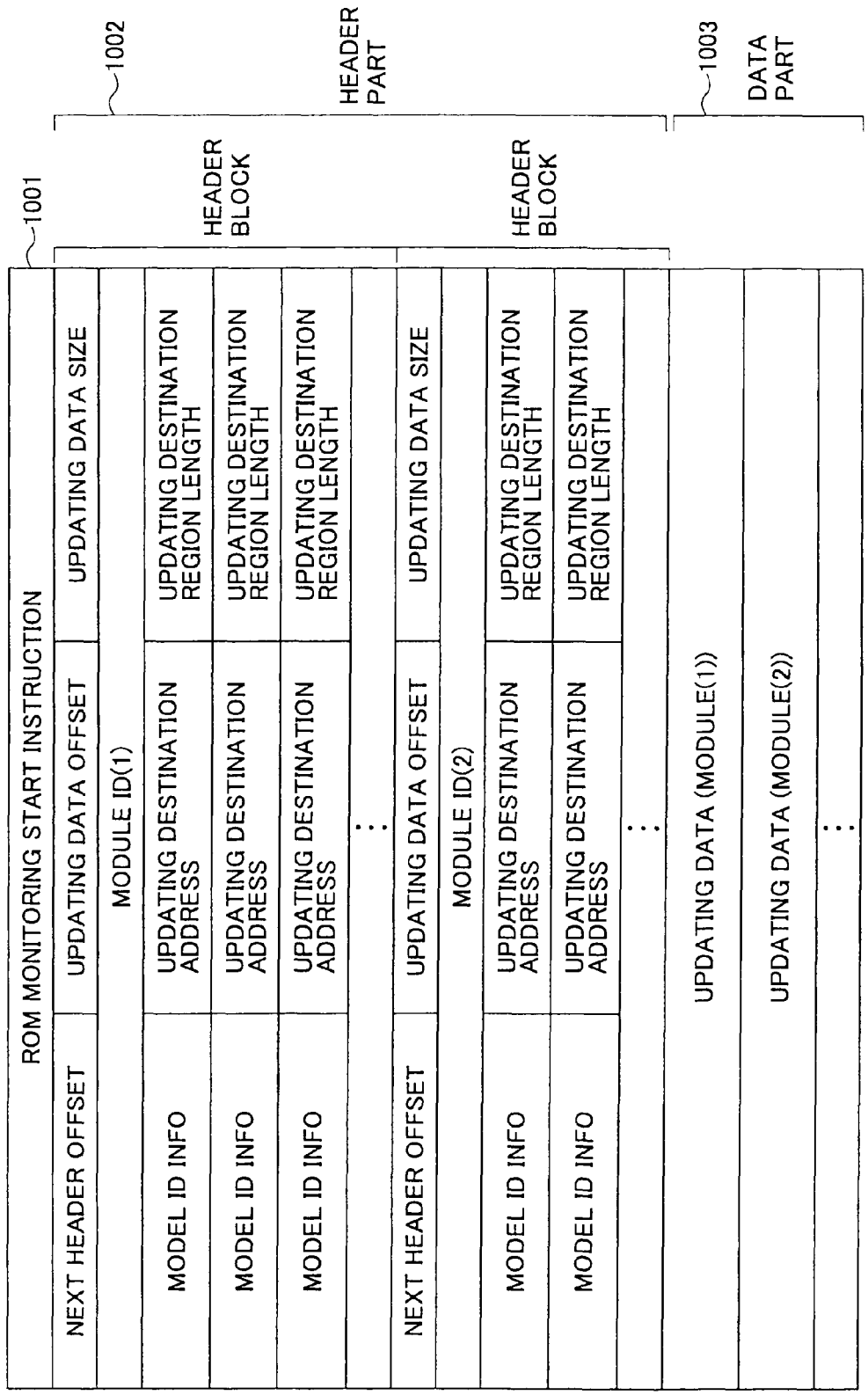
FIG. 11 is a diagram showing a data structure employed by an updating data packet received by a second embodiment of the image forming apparatus according to the present invention after developing the updating data packet.

FIG. 11 is a diagram showing a data structure employed by an updating data packet after the updating data packet received by the second embodiment of the image forming apparatus, that is, the composite apparatus 100, is developed. Similarly to the data structure of the updating data packet shown in FIG. 3 used in the first embodiment, the updating data packet shown in FIG. 11 includes a ROM monitoring start instruction 1001 at the beginning, a header part 1002, and a data part 1003.

The data structure employed by this second embodiment differs from that of the first embodiment described above, in that a plurality of model identification information, a plurality of updating destination addresses and a plurality of updating destination region lengths are provided with respect to each updating data in the header part 1002.

In other words, when updating the modules which are common to a plurality of models of the composite apparatus 100 using a common updating data, the model identification information of all models of the composite apparatus 100 which are updating targets, and the updating destination address and the updating destination region length in the flash ROM 204 for each of the models, are registered in the header block.

In this second embodiment, a composite apparatus starting section 140 of the composite apparatus 100 includes a ROM monitoring section 410, a program starting section 420, a ROM updating mode thread of an SCS 122, and a ROM updating section 430, similarly to the first embodiment. The ROM monitoring section 410 forms a model identification information acquiring means (or section), and the program starting section 420 forms a program starting means (or section) of this embodiment. The SCS 122 forms an updating data selection means (or section), and the ROM updating section 430 forms an updating means (or section) of this embodiment.

The structures of the program starting section 420 and the ROM updating section 430 of the composite apparatus 100 of this second embodiment are the same as those corresponding parts of the first embodiment described above, and illustration and description thereof will be omitted.

The ROM monitoring section 410 carries out processes such as initializing the hardware, diagnosing the controller board 200, initializing the software and starting the general purpose OS 121, similarly to that of the first embodiment. In addition, the ROM monitoring section 410 of this second embodiment acquires the model identification information of the composite apparatus 100.

Next, a description will be given of a ROM updating process of the composite apparatus 100 of this second embodiment. A general processing procedure of the ROM updating process is the same as that in the composite apparatus 100 of the first embodiment described above in conjunction with FIG. 5.

Figure 12:
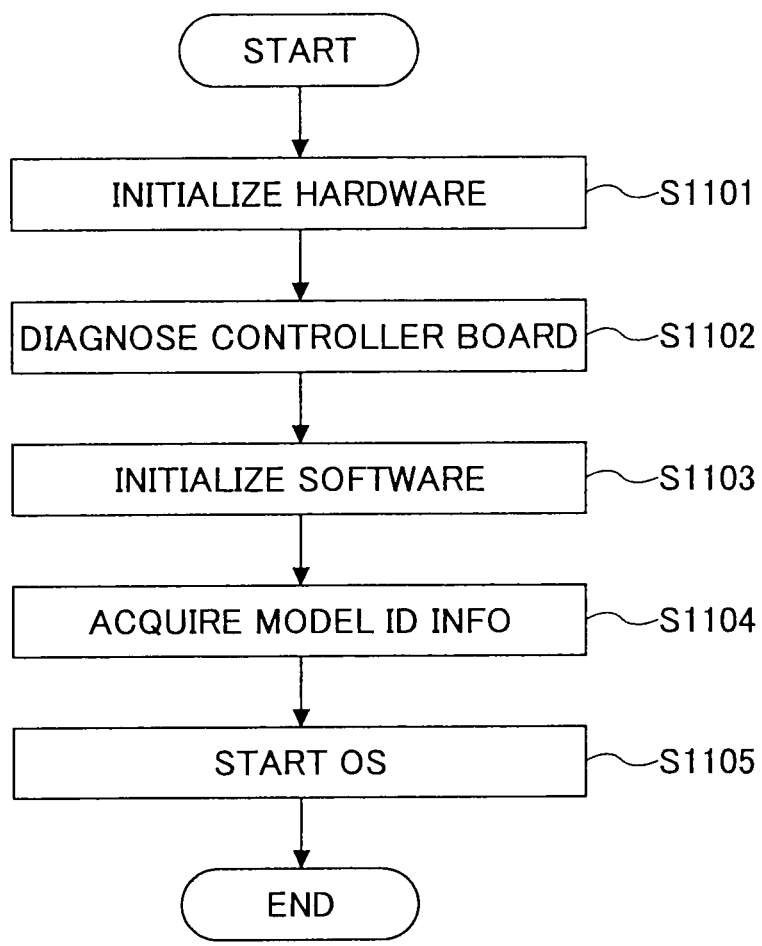
FIG. 12 is a flow chart for explaining a processing procedure carried out by a ROM monitoring section of the second embodiment of the image forming apparatus.

FIG. 12 is a flow chart for explaining a processing procedure carried out by the ROM monitoring section 410 of the second embodiment of the image forming apparatus, that is, the composite apparatus 100. In a step S1101 shown in FIG. 12, the ROM monitoring section 410 first carries out an initializing process to initialize the hardware. In a step S1102 after the step S1101, the ROM monitoring section 410 executes a diagnosing process with respect to the controller board 200. Then, in a step S1103, the ROM monitoring section 410 carries out an initializing process to initialize the software.

In a step S1104 after the step S1103, the ROM monitoring section 410 acquires the model identification information recorded in the flash ROM 204 of the composite apparatus 100. The model identification information is peculiar to each model, and is used to identify the model of the composite apparatus 100. The process advances to a step S1105 after the step S1104, and the step S1105 finally starts the general purpose OS 121.

Thereafter, the program starting section 420 of the composite apparatus 100 of this second embodiment starts the control service, and the following process is carried out by the ROM updating mode thread of the SCS 122 which is started, similarly to the first embodiment.

Figure 13:
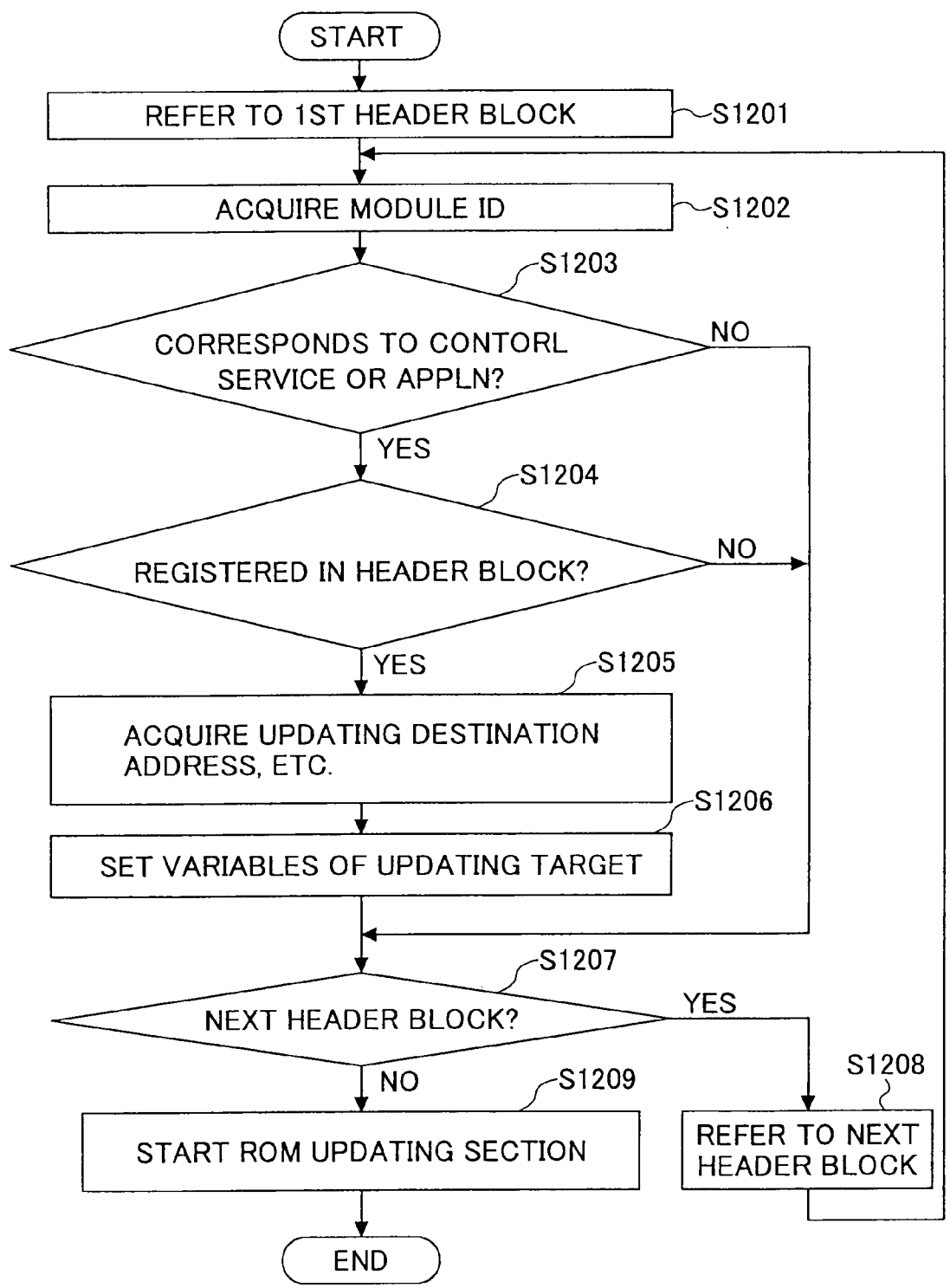
FIG. 13 is a flow chart for explaining a processing procedure of an updating data selection process carried out by a ROM updating mode thread of a SCS in the second embodiment.

FIG. 13 is a flow chart for explaining a processing procedure of an updating data selection process carried out by the ROM updating mode thread of the SCS 122 in the second embodiment. In a step S1201 shown in FIG. 13, the ROM updating mode thread of the SCS 122 makes a reference to a first header block of the SDRAM 203, similarly to the first embodiment. In a step S1202 after the step S1201, the ROM updating mode thread of the SCS 122 acquires the module ID from the header block.

In a step S1203 after the step S1202, the ROM updating mode thread of the SCS 122 judges whether or not the module ID acquired from the header block corresponds to the module of the control service included in the control service starting information or, the application included in the application starting information, of the environment variables received from the program starting section 420.

If the module ID acquired from the header block corresponds to the control service or application which operates in the composite apparatus 100 and the decision result in the step S1203 is YES, the process advances to a step S1204. In the step S1204, the ROM updating mode thread of the SCS 122 checks whether or not the model identification information of the composite apparatus 100 acquired by the ROM monitoring section 410 exists in the model identification information registered within the header block where the present module ID is located.

If the acquired model identification information exists within the header block and the decision result in the step S1204 is YES, the process advances to a step S1205. In the step S1205, the ROM updating mode thread of the SCS 122 selects the updating data of the module ID of the header block, and further acquires the updating destination address, the updating data offset and the updating data size from the header block.

In a step S1206 after the step S1205, the ROM updating mode thread of the SCS 122 sets a set of updating information made up of the module ID, the updating destination address, the updating data offset and the updating data size to variables of the "updating target", and the process advances to a step S1207.

On the other hand, if the module ID acquired from the header block does not correspond to the control service or application which operates in the composite apparatus 100 and the decision result in the step S1203 is NO or, the acquired model identification information does not exist within the header block and the decision result in the step S1204 is NO, the process advances to the step S1207. In other words, if the acquired module ID does not correspond to the control service or application which operates in the composite apparatus 100 or the acquired model identification information does not exist within the header block, the updating data corresponding to the present module ID is not selected, and the process of the steps S1204 through S1206 is not carried out.

In the step S1207, the ROM updating mode thread of the SCS 122 judges whether or not the next header block exists, similarly to the first embodiment. If the next header block exists and the decision result in the step S1207 is YES, the process advances to a step S1208. In the step S1208, the ROM updating mode thread of the SCS 122 makes a reference to the next header block. Thereafter, the ROM updating mode thread of the SCS 122 repeats the process of the steps S1202 through S1207.

On the other hand, if the next header block does not exist and the decision result in the step S1207 is NO, the process advances to a step S1209. In other words, when the selection of the updating data for the module ID ends with respect to all of the header blocks, the ROM updating mode thread of the SCS 122 starts the ROM updating section 430 to issue a ROM updating instruction, and transfers the variables of the updating target.

Accordingly, only the updating data of the module existing within the composite apparatus 100 is selected from the updating data supplied from the remote host depending on the model of the composite apparatus 100.

After the updating data selection process of the SCS 122, the ROM updating process is carried out by the ROM updating section 430. This ROM updating process is the same as that of the first embodiment, and a description thereof will be omitted.

Therefore, according to the composite apparatus 100 of this second embodiment, the ROM updating mode thread of the SCS 122 selects the updating data based on the model information which is acquired by the ROM monitoring section 410, the model identification information for each module ID, the starting information of each application or control service, and the module ID of the program included in the received updating data packet.

Hence, even in a case where the arrangements of the control services and applications which can operate in the composite apparatus 100 differ depending on the model of the composite apparatus 100, it is possible to use one kind of updating data packet in common when carrying out the ROM updating process in a plurality of models of the composite apparatus 100. In other words, the same updating data packet can be shared by the different models of the composite apparatus 100.

For this reason, it is unnecessary to manage different updating data packets for the different models of the composite apparatus 100. In addition, it is possible to prevent the ROM updating process from being carried out erroneously based on an updating data packet which does not suit the model of the composite apparatus 100, and an optimum ROM updating process (program updating process) can be carried out to suit the configuration of each composite apparatus 100.

Moreover, the remote host, such as the host computer of the developer who develops the composite apparatus 100 or the third vendor of the developer who develops the applications, does not need to send different updating data packets to the contractors, namely, the different models of the composite apparatus 100. Thus, the ROM updating operation on the transmitting end which sends the updating data packet is facilitated.

In the composite apparatus 100 of the first and second embodiments, the normal mode thread of the SCS 122 issues a restart command of the composite apparatus 100 when the NCS 128 receives the ROM updating request packet, so as to automatically restart the composite apparatus 100. However, the operator may manually restart the composite apparatus by turning OFF and turning ON the power of the composite apparatus 100 after setting the ROM updating flag to the ON state by the SCS 122.

(Third Embodiment)

In the ROM updating process of the composite apparatus 100 in the first and second embodiments described above, the ROM updating process is carried out after restarting the composite apparatus 100 in the ROM updating mode, when the ROM updating request packet is received via the network 271.

Accordingly, in a third embodiment of the image forming apparatus according to the present invention, the composite apparatus 100 is not restarted when the ROM updating request packet is received, and instead, the ROM updating process is carried out by dynamically switching the normal mode thread of each control service to the ROM updating mode thread.

The functional structure and the hardware structure of this third embodiment of the image forming apparatus are the same as the functional structure and the hardware structure of the first embodiment of the image forming apparatus, that is, the composite apparatus 100, shown in FIGS. 1 and 2, and illustration and description thereof will be omitted. In addition, the data structure employed by the updating data packet after the updating data packet received by the third embodiment of the image forming apparatus, that is, the composite apparatus 100, is developed, may be the same as that shown in FIG. 3 used in the first embodiment, and illustration and description thereof will also be omitted.

In the composite apparatus 100 of this third embodiment, the copy application 112, the facsimile application 113, the printer application 111, the scanner application 114 and the network file application 115 of the applications 130 carry out composite services similar to those of the composite apparatus 100 of the first and second embodiments. Each of these applications 130 includes a normal mode thread which is executed when carrying out the composite services, and a ROM updating mode thread which is simply started when carrying out the ROM updating process and in which the processes related to the composite services are stopped.

In the composite apparatus 100 of this third embodiment, when the NCS 128 receives the ROM updating request packet, the RRU application 117 is started by the normal mode thread of the SCS 122.

In addition, unlike in the first and second embodiments, the normal mode thread of the SCS 122 in the composite apparatus 100 of this third embodiment does not carry out the processes of issuing the restart command of the composite apparatus 100 and setting the ROM updating flag in the SRAM 208 to the ON state, even when the NCS 128 receives the ROM updating request packet. Instead, the normal mode thread of the SCS 122 starts the RRU application 117, and further stops the normal mode threads and requests the start of only the ROM updating mode threads, with respect to the copy application 112, the facsimile application 113, the printer application 111, the scanner application 114 and the network file application 115 of the applications 130 and the other control services.

Next, a description will be given of the ROM updating process of the composite apparatus 100 of this third embodiment. FIGS. 14A, 14B and 14C are block diagrams for explaining an entire processing procedure of a remote ROM updating process in the third embodiment of the image forming apparatus according to the present invention, that is, the composite apparatus 100. In FIGS. 14A through 14C, those parts which are the same as those corresponding parts in FIG. 1 are designated by the same reference numerals, and a description thereof will be omitted.

FIG. 14A shows the operation that is carried out when the composite apparatus 100 receives the ROM updating request. FIG. 14B shows the state where a transition is made to the ROM updating mode after the composite apparatus 100 receives the ROM updating request. In addition, FIG. 14C shows the operation that is carried out when the composite apparatus 100 receives the updating data packet.

In FIG. 14A, when the composite apparatus 100 carries out the operation of the normal composite service, each application and each control service execute the normal mode thread.

In this state, when the ROM updating request packet is received from a remote host via the network 271, the normal mode thread of the NCS 128 advances to a step S1301 and receives this ROM updating request packet. The remote host may be a host computer of a developer who develops the composite apparatus 100 or, a third vendor of a developer who develops the applications.

In a step S1302, the normal mode thread of the NCS 128 judges the contents of the received packet, and if the received packet is the ROM updating request packet, notifies the existence of the ROM updating request to the SCS 122.

In a step S1303, when the SCS 122 receives the notification from the NCS 128 indicating the existence of the ROM updating request, the SCS 122 makes a request to stop the normal mode thread and to start the ROM updating mode thread with respect to all of the applications which are presently operating. In a step S1304, the SCS 122 makes a request to stop the normal mode thread and to start the ROM updating mode thread with respect to the SRM 123 and all of the control services which are presently operating, when a notification indicating the existence of the ROM updating request is received. Furthermore, the normal mode thread of the SCS 122 starts the RRU application 117, and starts the ROM updating mode thread of the SCS 122 itself.

The SRM 123, all of the control services and all of the applications which respectively receive the request to stop the normal mode thread and to start the ROM updating mode thread, switch the thread which is being executed from the normal mode thread to the ROM updating mode thread. As a result, the functions of the composite services of the composite apparatus 100 are stopped, and the composite apparatus 100 makes a transition from the normal mode to the ROM updating mode in which the ROM updating process can be carried out.

As shown in FIG. 14B, the composite apparatus 100 receives via the network 271 a ROM updatable state confirmation packet from the remote host (the host computer of the developer who develops the composite apparatus 100 or, the third vendor of the developer who develops the applications) that made the ROM updating request.

In a step S1305 shown in FIG. 14B, the ROM updating mode thread of the NCS 128 receives the ROM updatable state confirmation packet. In a step S1306, the ROM updating mode thread of the NCS 128 transfers the received ROM updatable state confirmation packet to the RRU application 117.

In this state, the ROM updating process is possible because the mode of the composite apparatus 100 has already made a transition to the ROM updating mode. In a step S1307, the RRU application 117 sends to the NCS 128 a remote ROM updatable message which indicates that the remote ROM updating process is possible, as a response message with respect to the ROM updatable state confirmation packet. In a step S1308, the ROM updating mode thread of the NCS 128 sends the remote ROM updatable message via the network 271 to the remote host that is the transmitting source of the ROM updatable state confirmation packet.

When the NCS 122 sends to the remote host the response with respect to the ROM updatable state confirmation packet, the remote host sends the updating data packet as shown in FIG. 14C. Hence, in a step S1309 shown in FIG. 14C, the composite apparatus 100 receives the updating data packet from the remote host by the ROM updating mode thread of the NCS 128. In a step S1310, the ROM updating mode thread of the NCS 128 transfers the received updating data packet to the RRU application 117.

In a step S1311, the RRU application 117 requests the MCS 125 to secure the updating data region in the SDRAM 203 by making a region secure request, in order to obtain the necessary region for the updating data packet which is developed.

In a step S1312, the ROM updating mode thread of the MCS 125, which receives the region secure request, secures the updating data region in the SDRAM 203, and returns to the RRU application 117 a starting address of the secured updating data region and the secured region size.

In the RRU application 117, the network information is removed, and the updating data packet is developed from the starting address of the updating data region notified from the ROM updating mode thread of the MCS 125, by expanding the updating data packet in the compressed form. As a result, the updating data packet having the data structure shown in FIG. 3 is stored in the updating data region of the SDRAM 203.

In a step S1313, the RRU application 117 notifies to the SCS 122 the starting address of the updating data region in the SDRAM 203 where the updating data packet is developed. Consequently, the updating data selection process is carried out by the ROM updating mode thread of the SCS 122.

The updating data selection process by the SCS 122 and the process of rewriting or updating the program in the flash ROM 204 by the ROM updating section 430 which are carried out thereafter, are the same as those of the composite apparatus 100 of the first embodiment described above, and a description thereof will be omitted.

Therefore, according to the composite apparatus 100 of this third embodiment, when the NCS 122 receives the ROM updating request packet, all of the applications 130, all of the control services and the SRM 123 stop the normal mode thread and start the ROM updating mode thread in response to the instruction from the SCS 122.

Accordingly, in the composite apparatus 100 of this third embodiment, the functions of the composite services can be stopped and the transition to the ROM updating mode can be made by switching the threads having a short switching time. Hence, compared to the case where the composite apparatus 100 is restarted or the processes having a long switching time are switched, it is possible to quickly carry out the ROM updating process in response to the ROM updating request.

In the composite apparatus 100 of this third embodiment, the SCS 122 makes the start request for the ROM updating mode thread with respect to the control services and the applications. However, it is of course possible to make the start request from the program starting section 420 or other processes.

According to the composite apparatus 100 of the first through third embodiments described above, the updating data packet is received after receiving the ROM updating request packet via the network 271. However, the ROM updating request packet may not be sent from the remote host and the updating data packet may be received without notice.

When receiving the updating data packet without notice, this updating data packet may be regarded as a ROM updating request and stored in a non-volatile memory such as the SRAM 208. After storing the updating data packet in the SRAM 208, the SCS 122 may restart the composite apparatus 100, so as to carry out a process similar to that described above.

In this case, instead of starting the RRU application 117 after restarting the composite apparatus 100, the RRU application 117 may be started by the SCS 122 or the like and the ROM updating mode thread of the MCS 125 may be started, when the updating data packet is received. In this case, the composite apparatus 100 may be restarted after developing the updating data packet in the SDRAM 203.

(Fourth Embodiment)

According to the composite apparatus 100 of the first through third embodiments described above, the ROM updating process is carried out by starting the RRU application 117 when the ROM updating request packet is received via the network 271.

On the other hand, according to the composite apparatus 100 of this fourth embodiment, the RRU application 117 is started in advance at a timing such as when starting the composite apparatus 100. The ROM updating process is carried out by dynamically switching the normal mode thread of each of the control services to the ROM updating mode thread when the updating data packet is received without notice, without having to receive the ROM updating request packet.

The functional structure and the hardware structure of this fourth embodiment of the image forming apparatus are the same as the functional structure and the hardware structure of the first embodiment of the image forming apparatus, that is, the composite apparatus 100, shown in FIGS. 1 and 2, and illustration and description thereof will be omitted. In addition, the data structure employed by the updating data packet after the updating data packet received by the third embodiment of the image forming apparatus, that is, the composite apparatus 100, is developed, may be the same as that shown in FIG. 3 used in the first embodiment, and illustration and description thereof will also be omitted.

In the composite apparatus 100 of this fourth embodiment, the copy application 112, the facsimile application 113, the printer application 111, the scanner application 114 and the network file application 115 of the applications 130 carry out composite services similar to those of the composite apparatus 100 of the first and second embodiments. Each of these applications 130 includes a normal mode thread which is executed when carrying out the composite services, and a ROM updating mode thread which is simply started when carrying out the ROM updating process and in which the processes related to the composite services are stopped.

In the composite apparatus 100 of this fourth embodiment, the RRU application 117 is started by the normal mode thread of the SCS 122 when the composite apparatus 100 is started, for example.

In addition, unlike in the first and second embodiments, the normal mode thread of the SCS 122 in the composite apparatus 100 of this fourth embodiment does not receive the ROM updating request packet by the NCS 128, and does not carry out the processes of issuing the restart command of the composite apparatus 100 and setting the ROM updating flag in the SRAM 208 to the ON state.

Instead, the normal mode thread of the SCS 122 stops the normal mode threads and requests the start of only the ROM updating mode threads, with respect to the copy application 112, the facsimile application 113, the printer application 111, the scanner application 114 and the network file application 115 of the applications 130 and the other control services.

Figures 15A, 15B:
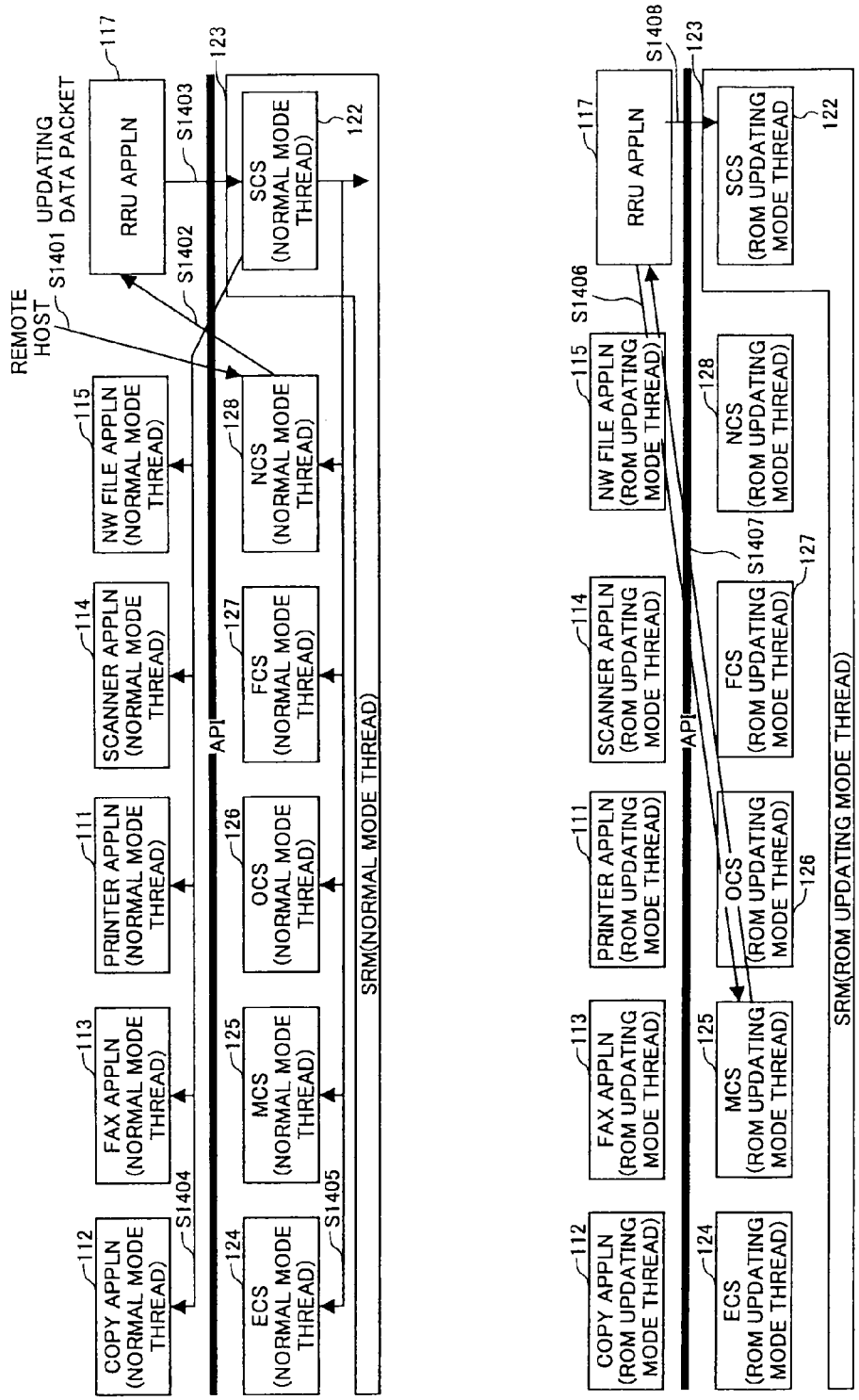
FIGS. 15A and 15B are block diagrams for explaining an entire processing procedure of a remote ROM updating process in a fourth embodiment of the image forming apparatus according to the present invention.

Next, a description will be given of the ROM updating process of the composite apparatus 100 of this fourth embodiment. FIGS. 15A and 15B are block diagrams for explaining an entire processing procedure of a remote ROM updating process in the fourth embodiment of the image forming apparatus according to the present invention, that is, the composite apparatus 100. In FIGS. 15A and 15B, those parts which are the same as those corresponding parts in FIG. 1 are designated by the same reference numerals, and a description thereof will be omitted.

FIG. 15A shows the operation that is carried out when the composite apparatus 100 receives the updating data packet. In addition, FIG. 15B shows the state where a transition is made to the ROM updating mode after the composite apparatus 100 receives the updating data packet.

In FIG. 15A, when the composite apparatus 100 carries out the operation of the normal composite service, each application and each control service execute the normal mode thread.

In this state, when the updating data packet is received from a remote host via the network 271, the normal mode thread of the NCS 128 advances to a step S1401 and receives this updating data packet. The remote host may be a host computer of a developer who develops the composite apparatus 100 or, a third vendor of a developer who develops the applications.

In a step S1402, the normal mode thread of the NCS 128 judges the contents of the received packet, and if the received packet is the updating data packet, notifies the existence of the updating data packet to the RRU application 117.

In a step S1403, when the RRU application 117 receives the updating data packet, the RRU application 117 notifies the receipt of the updating data packet to the SCS 122. In a step S1404, the SCS 122 makes a request to stop the normal mode thread and to start the ROM updating mode thread with respect to all of the applications which are presently operating, when a notification indicating the receipt of the updating data packet is received.

In a step S1405, the SCS 122 makes a request to stop the normal mode thread and to start the ROM updating mode thread with respect to all of the control services and the SRM 123 which are presently operating, when a notification indicating the receipt of the updating data packet is received. Further, the normal mode thread of the SCS 122 starts the RRU application 117, and the SCS 122 starts the ROM updating mode thread of the SCS 122 itself.

The SRM 123, all of the control services and all of the applications which respectively receive the request to stop the normal mode thread and to start the ROM updating mode thread, switch the thread which is being executed from the normal mode thread to the ROM updating mode thread. As a result, the functions of the composite services of the composite apparatus 100 are stopped, and the composite apparatus 100 makes a transition from the normal mode to the ROM updating mode in which the ROM updating process can be carried out.

In a step S1406 shown in FIG. 15B, when the transition is made to the ROM updating mode in which the ROM updating process can be carried out, the RRU application 117 requests the MCS 125 to secure the updating data region in the SDRAM 203 by making a region secure request, in order to obtain the necessary region for the updating data packet which is developed. In a step S1407, the ROM updating mode thread of the MCS 125, which receives the region secure request, secures the updating data region in the SDRAM 203, and returns to the RRU application 117 a starting address of the secured updating data region and the secured region size.

In the RRU application 117, the network information is removed, and the updating data packet is developed from the starting address of the updating data region notified from the ROM updating mode thread of the MCS 125, by expanding the updating data packet in the compressed form. As a result, the updating data packet having the data structure shown in FIG. 3 is stored in the updating data region of the SDRAM 203.

In a step S1408, the RRU application 117 notifies to the SCS 122 the starting address of the updating data region in the SDRAM 203 where the updating data packet is developed. Consequently, the updating data selection process is carried out by the ROM updating mode thread of the SCS 122.

The updating data selection process by the SCS 122 and the process of rewriting or updating the program in the flash ROM 204 by the ROM updating section 430 which are carried out thereafter, are the same as those of the composite apparatus 100 of the first embodiment described above, and a description thereof will be omitted.

Therefore, according to the composite apparatus 100 of this fourth embodiment, when the NCS 122 receives the updating data packet, all of the applications 130, all of the control services and the SRM 123 stop the normal mode thread and start the ROM updating mode thread in response to the instruction from the SCS 122.

Accordingly, in the composite apparatus 100 of this fourth embodiment, the functions of the composite services can be stopped and the transition to the ROM updating mode can be made by switching the threads having a short switching time. Hence, compared to the case where the composite apparatus 100 is restarted or the processes having a long switching time are switched, it is possible to quickly carry out the ROM updating process in response to the updating data packet.

In the composite apparatus 100 of this fourth embodiment, the SCS 122 makes the start request for the ROM updating mode thread with respect to the control services and the applications. However, it is of course possible to make the start request from the program starting section 420 or other processes.

According to the composite apparatus 100 of the first through fourth embodiments, the updating data selection process is carried out by the ROM updating mode thread of the SCS 122. However, it is of course possible to start a process other than the SCS 122 by the program starting section 420, and to carry out the updating data selection process by this other process which is started.

Further, the present invention is not limited to these embodiments, but various variations and modifications may be made without departing from the scope of the present invention.

The invention claimed is:

1. An image forming apparatus comprising:
    a hardware resource including at least one of a printer and a scanner;
    a processor;
    an operating system;
    a storage unit configured to store a plurality of application software, executable on the operating system by the processor and configured to provide services related to an image forming process, each of the plurality of application software being stored in a manner such that the plurality of application software are updateable in units of application software;
    a control program executable on the operating system by the processor and configured to receive a processing request from any of the plurality of application software, and to control the hardware resource based on the received processing request;
    a receiving unit configured to receive updating data;
    a judging unit configured to judge whether there exists, amongst the plurality of application software stored in the storage unit, application software to be updated based on the updating data received by the receiving unit; and
    an updating unit configured to update the application software to be updated based on the updating data received by the receiving unit when the judging unit judges that the application software to be updated exists amongst the plurality of application software stored in the storage unit.

2. The image forming apparatus as claimed in claim 1, wherein the receiving unit is configured to receive the updating data via a network.

3. The image forming apparatus as claimed in claim 1, wherein
the control program is further configured to receive the processing request via an application program interface from any of the plurality of application software, and to control the hardware resource based on the received processing request.

4. The image forming apparatus as claimed in claim 1, wherein the plurality of application software interface indirectly with the hardware resources via the control program.

5. The image forming apparatus as claimed in claim 2, wherein the receiving unit is further configured to receive the updating data from an external apparatus via the network.

6. The image forming apparatus as claimed in claim 1, wherein the storage unit is further configured to store the updating data received by the receiving unit.

7. The image forming apparatus as claimed in claim 1, wherein the updating unit is further configured to rewrite the application software to be updated based on the updating data received by the receiving unit.

8. The image forming apparatus as claimed in claim 1, further comprising:
a stopping unit configured to stop an application software that is operating among the plurality of application software,
wherein the updating unit updates the application software that is stopped by the stopping unit.

9. The image forming apparatus as claimed in claim 8, wherein the stopping unit stops all application software.

* * * * *